United States Patent
Akasaka

(10) Patent No.: US 9,073,255 B2
(45) Date of Patent: *Jul. 7, 2015

(54) DEVICE AND METHOD FOR PLASTICIZATION CONTROL OF ELECTRIC INJECTION MOLDING MACHINE

(76) Inventor: Noriyuki Akasaka, Kuwana (JP)

( * ) Notice: Subject to any disclaimer, the term of this patent is extended or adjusted under 35 U.S.C. 154(b) by 174 days.

This patent is subject to a terminal disclaimer.

(21) Appl. No.: 13/128,874

(22) PCT Filed: Jun. 20, 2010

(86) PCT No.: PCT/JP2010/060404
§ 371 (c)(1),
(2), (4) Date: Jul. 19, 2011

(87) PCT Pub. No.: WO2011/099175
PCT Pub. Date: Aug. 18, 2011

(65) Prior Publication Data
US 2011/0298146 A1 Dec. 8, 2011

(30) Foreign Application Priority Data
Feb. 9, 2010 (JP) .................................. 2010-027043

(51) Int. Cl.
B29C 45/77 (2006.01)

(52) U.S. Cl.
CPC ....... *B29C 45/77* (2013.01); *B29C 2945/76006* (2013.01); *B29C 2945/76083* (2013.01); *B29C 2945/76113* (2013.01); *B29C 2945/76187* (2013.01); *B29C 2945/76367* (2013.01); *B29C 2945/76498* (2013.01); *B29C 2945/76665* (2013.01); *B29C 2945/76846* (2013.01); *B29C 2945/76969* (2013.01)

(58) Field of Classification Search
CPC ....................................................... B29C 45/77

USPC ................................ 264/40.1, 403; 425/149
See application file for complete search history.

(56) References Cited

U.S. PATENT DOCUMENTS

| 6,695,994 B2 | 2/2004 | Bulgrin et al. |
| 2006/0145379 A1 | 7/2006 | Okazaki |

FOREIGN PATENT DOCUMENTS

| JP | 62117721 A | 5/1987 |
| JP | 7009513 A | 1/1995 |

(Continued)

*Primary Examiner* — Larry Thrower
*Assistant Examiner* — Xue Liu

(57) ABSTRACT

The exact method with small time-lag of detecting screw back pressure for controlling the screw back pressure in the plasticizing process of an electric-motor driven injection molding machine without using a pressure detector has been asked for because the pressure detector is very expensive, necessitates troublesome works for mounting, an electric protection against noise and the works for zero-point and span adjustings and causes a complicate mechanical structure.

The present invention uses a high-gain observer which contains the discrete-time arithmetic expressions derived from a mathematical model of a plasticizing mechanism in an electric-motor driven injection molding machine consisting of state equations and outputs an estimate of screw back pressure, which is one of the state variables of the above state equations, by using a screw position signal, a servomotor current demand signal or actual motor current signal and a screw revolution speed signal as inputs. The high-gain observer obtains the exact screw back pressure estimate with very small time-lag without using a pressure detector. Thus the estimate of screw back pressure fed by the high-gain observer can be adopted as a feedback signal of actual screw back pressure for controlling the screw back pressure in the plasticizing process.

2 Claims, 7 Drawing Sheets

(56) References Cited

FOREIGN PATENT DOCUMENTS

| JP | 7205230 A | 8/1995 |
|----|-----------|--------|
| JP | 4589460 B | 12/2010 |
| JP | 4674923 B | 4/2011 |
| JP | 4674924 B | 4/2011 |
| JP | 4678894 B | 4/2011 |

DEVICE AND METHOD FOR PLASTICIZATION CONTROL OF ELECTRIC INJECTION MOLDING MACHINE

TECHNICAL FIELD

This invention is concerning an apparatus and a method for controlling a plasticizing capability in an electric-motor driven injection molding machine.

BACKGROUND ART

AC servomotors are becoming used for middle-sized injection molding machines heretofore driven by hydraulic actuators (clamping force>3.5 MN) that have high precision, quick response and higher power which are obtained by performance improvements of permanent magnets and cost reductions.

An injection molding machine consists of a plasticizier in which resin pellets are melted by friction heat generated by plasticizing screw revolution and stored at the end of a barrel, an injector in which an amount of melted polymer is injected into a metal mold at a given velocity and a given dwell pressure is applied, and a clamper in which the metal mold is clamped and opened, all using AC servomotors drive system. FIG. 3 is a view which shows an existing plasticizing mechanism by AC servomotors.

On an injection machine base which is fixed on the ground, a movable base is located which moves on a linear slider and both the bases are not shown in FIG. 3. All parts except a metal mold 1 shown in FIG. 3 are mounted on the movable base. By sliding the movable base, the top of a barrel 2 is clamped on the metal mold 1 and vice versa the top of the barrel 2 is separated from the metal mold 1. FIG. 3 shows a mode in which the resin pellets are melted by the screw revolution in the plasticizing process.

On the movable base, a servomotor for injection 3, a reduction gear 4, a ball screw 5 and a bearing 6 are fixed. A nut 7 of the ball screw 5, a moving part 8, a screw 9, a reduction gear 10, a servomotor for plasticization 11 and a pressure detector 12 such as a load cell consist of an integral structure. The moving part 8 is mounted on a linear slider 13 so that the integral structure is moved back and forth by the movement of the nut 7.

Rotation of the servomotor for injection 3 is transferred to the ball screw 5 which magnifies a linear force through the reduction gear 4 and the rotation of the ball screw 5 is converted to a linear motion of the nut 7 of the ball screw 5 and through the moving part 8, a linear motion of the screw 9 and pressure application to the stored melted polymer are realized. Pressure applied to the melted polymer by the screw 9 in the plasticizing process is hereinafter referred to as a screw back pressure. Position of the screw 9 is detected by a rotary encoder 14 mounted on the servomotor for injection 3. The screw back pressure to the melted polymer stored at the end of the barrel 2 is detected by the pressure detector 12 such as a load cell mounted between the nut 7 and the moving part 8. The screw 9 is rotated by the servomotor for plasticization 11 through the reduction gear 10 in the plasticizing process in which resin pellets are melted and kneaded and a rotary encoder 15 is mounted on the servomotor for plasticization 11.

Explaining an injection molding process with referent to FIG. 3, resin pellets are fed to the screw 9 through a hopper 16 and are melted by the screw 9 rotated by the servomotor for plasticization 11 and the melted polymer is pushed out from the top of the screw 9 and the screw 9 is moved back by the generated screw back pressure. The screw back pressure is a linear force applied to the melted polymer decided by a generated motor torque of the servomotor for injection 3. The servomotor for plasticization 11 continues to rotate until a given amount of melted polymer necessary for molding a product is stored at the end of the barrel 2 and then the plasticizing process is finished with the stop of the screw revolution.

Next the screw 9 is moved forward rapidly by a high-speed revolution of the servomotor for injection 3 and the stored melted polymer at the end of the barrel 2 is injected into a cavity 17 as fast as possible and a given pressure is applied for a given duration at the polymer in the cavity 17 and then the injection process is finished and a molding product with a given figure is taken out from the metal mold 1.

It is necessary to get the melted polymer of homogeneous property in the plasticizing process in order to manufacture good-quality molding products. But as the stored melted polymer at the end of the barrel 2 increases in the plasticizing process, an effective length of the screw 9 for plasticizing the resin pellets decreases as the result of the backward movement of the screw 9 in the barrel 2. Therefore, the decrease of the effective length of the screw brings about a variation in the property of the melted polymer, that is, the property of the melted polymer generated at the initial stage of plasticization is different from that of the melted polymer generated at the final stage. To make up for this defect, some methods are applied in which a given pattern of screw back pressure corresponding to the backward movement of the screw 9 is realized in the plasticizing process in order to get a homogeneous property of the melted polymer.

In patent literatures PTL 1 and PTL 2, a given screw revolution is realized by a servomotor for plasticization and the speed control of a screw backward movement by a servomotor for injection realizes a given pattern of screw back pressure.

In patent literatures PTL 3 and PTL 4, a constant speed or a given speed pattern of a screw backward movement is realized by a servomotor for injection and the rotation speed control of a screw by a servomotor for plasticization realizes a given pattern of screw back pressure.

In patent literatures PTL 5 and PTL 6, a given pattern of screw back pressure is realized by a motor current (torque) limit control or a motor current (torque) control of a servomotor for injection.

In patent literatures PTL 7 and PTL 8, the position control of a screw by a servomotor for injection realizes a given pattern of screw back pressure.

In patent literatures PTL 9 and PTL 10, a given revolution speed of a screw is realized by a servomotor for plasticization and a speed control of the screw backward movement by a servomotor for injection realizes a given pattern of screw back pressure and in the speed control of the screw backward movement a set value of screw backward speed modified by a control deviation of the screw back pressure is used.

In patent literature PTL 11, the control mode transfer from the first control mode to the second control mode is carried out. In the first control mode a screw revolution control is carried out by a servomotor for plasticization and a screw back pressure control is carried out by a servomotor for injection. In the second control mode a screw back pressure control is carried out by a servomotor for plasticization and a speed control of screw backward movement is carried out by a servomotor for injection.

In patent literatures PTL 1~PTL 11, a screw back pressure control is absolutely necessary in the plasticizing process and a pressure detector is required to realize an accurate control of screw back pressure.

In patent literature PTL 12, a pressure detector with a small dynamic range (0~15.2 MPa) is used for plasticization and a pressure detector with a large dynamic range (15.2~304 MPa) is used for injection and pressure application. The control accuracy of screw back pressure in the plasticizing process is improved by using a pressure detector with a smaller dynamic range.

FIG. 4 is an explanation drawing which shows a block diagram of a plasticizing controller. The plasticizing controller consists of a back pressure controller 20, a motor controller (servoamplifier) for injection 30, a screw revolution speed controller 40, a motor controller (servoamplifier) for plasticization 50 and a pressure detector 12.

The back pressure controller 20 executes a control algorithm at a constant time interval and a discrete-time control is used. The back pressure controller 20 consists of a screw back pressure setting device 21, a subtracter 22, an analog/digital (A/D) converter 23, a pressure controller 24 and a digital/analog (D/A) converter 25. The pressure detector 12 is connected to the A/D converter 23.

The screw back pressure setting device 21 feeds a time sequence of screw back pressure command $P^*_b$ to the subtracter 22. The pressure detector 12 feeds an actual screw back pressure signal $P^*_b$ to the subtracter 22 through the A/D converter 23. The subtracter 22 calculates a back pressure control deviation $\Delta P_b = P^*_b - P_b$ and the control deviation $\Delta P_b$ is fed to the pressure controller 24. The pressure controller 24 calculates a motor current demand $i^*_m$ for the servomotor for injection 3 from $\Delta P_b$ by using PID (Proportional+Integral+Derivative) control algorithm and feeds the demand $i^*_m$ to the motor controller for injection 30 through the D/A converter 25.

The motor controller for injection 30 consists of an analog/digital (A/D) converter 31 and a PWM (Pulse Width Modulation) device 32. The motor controller for injection 30 is connected to the servomotor for injection 3 equipped with a rotary encoder 14. The A/D converter 31 feeds the motor current demand $i^*_m$ from the D/A converter 25 to the PWM device 32. The PWM device 32 applies three-phase voltage to the servomotor for injection 3 so that the servomotor for injection 3 is driven by the motor current $i^*_m$. A linear force by the screw 9 applied to the melted polymer stored at the end of the barrel 2 decided by a generated motor current $i^*_m$ (motor torque) realizes a given screw back pressure $P^*_b$.

The screw revolution speed controller 40 consists of a screw revolution speed setting device 41. The screw revolution speed setting device 41 feeds a time sequence of screw revolution speed command $N^*_s$ to the motor controller for plasticization 50.

The motor controller for plasticization 50 consists of a subtracter 51, a differentiator 52, a speed controller 53 and a PWM device 54. The screw revolution speed command $N^*_s$ from the screw revolution speed controller 40 is fed to the subtracter 51. The rotary encoder 15 mounted on the servomotor for plasticization 11 feeds a pulse train to the differentiator 52. The differentiator 52 detects an actual screw revolution speed $N_s$ and feeds the speed signal $N_s$ to the subtracter 51. The subtracter 51 calculates a screw speed control deviation $\Delta N_s = N^*_s - N_s$ and feeds the control deviation $\Delta N_s$ to the speed controller 53. The speed controller 53 calculates a motor current demand $i^*$ for the servomotor for plasticization 11 from $\Delta N_s$ by using PID control algorithm and feeds the demand $i^*$ to the PWM device 54. The PWM device 54 applies three-phase voltage to the servomotor for plasticization 11 so that the servomotor for plasticization 11 is driven by the motor current $i^*$ and a given screw revolution speed $N^*_s$ is realized.

But the usage of the pressure detector in the plasticizing process brings about the following disadvantages.

(1) A highly reliable pressure detector is very expensive under high pressure circumstances.
(2) Mounting a pressure detector in the cavity or the barrel nozzle part necessitates the troublesome works and the working cost becomes considerable.
(3) Mounting a load cell in an injection shafting alignment from a servomotor for injection to a screw complicates the mechanical structure and degrades the mechanical stiffness of the structure.
(4) A load cell which uses strain gauges as a detection device necessitates an electric protection against noise for weak analog signals. Moreover the works for zero-point and span adjustings of a signal amplifier are necessary (patent literature PTL 13).
(5) For the improvement of the control accuracy of screw back pressure, the usage of two kinds of pressure detectors with different dynamic ranges brings about the cost increase (patent literature PTL 12).

CITATION LIST

Patent Literature

PTL 1: Patent 61-37409
PTL 2: Patent 61-217227
PTL 3: Patent 61-72512
PTL 4: Patent 2005-35132
PTL 5: Patent 61-258722
PTL 6: Patent 3-58818
PTL 7: Patent 2-130117
PTL 8: Patent 4-249129
PTL 9: Patent 2-120020
PTL 10: Patent 7-9513
PTL 11: Patent 2002-321264
PTL 12: Patent 2000-351139
PTL 13: Patent 2003-211514

Non Patent Literature

NPL 1: H. K. Khalil, Nonlinear Systems, 14.5 High-Gain Observer, Prentice-Hall, (2002), pp. 610-625
NPL 2: B. D. O. Anderson and J. B. Moore, Optimal Control, Linear Quadratic Methods, 7.2 Deterministic Estimator Design, Prentice-Hall, (1990), pp. 168-178
NPL 3: A. M. Dabroom and H. K. Khalil, Discrete-time implementation of high-gain observers for numerical differentiation, Int. J. Control, Vol. 72, No. 17, (1999), pp. 1523-1537
NPL 4: A. M. Dabroom and H. K. Khalil, Output Feedback Sampled-Data Control of Nonlinear Systems Using High-Gain Observers, IEEE trans. Automat. Contr., Vol. 46, No. 11, (2001), pp. 1712-1725

SUMMARY OF INVENTION

Technical Problem

The problem that starts being solved is to realize a plasticizing controller of electric-motor driven injection molding machines which satisfies the requirement that an adequate screw back pressure is applied to the melted polymer stored at the end of the barrel during the plasticizing process without using a pressure detector in order to avoid the five disadvantages described in Background Art (paragraph {0024}) resulted by using a pressure detector.

Solution to Problem

A control of screw back pressure is an effective means to obtain the homogeneous property of melted polymer and to improve the metering accuracy in the plasticizing process. In order to realize an accurate control of screw back pressure without using a pressure detector, a detecting means of screw back pressure which satisfies the following two requirements (A) and (B) is required.
(A) The detection means is high-precision.
(B) The detection means has very small time-lag.

The method of a high-gain observer (non patent literature NPL 1) is used as a pressure detecting means which satisfies the above two requirements. The high-gain observer estimates all state variables by using detected variables and satisfies the above two requirements (A) and (B). This is explained by using a simple mathematical model as follows. Equation (1) shows a state equation of a simple model.

{Math. 1}

$$\left.\begin{array}{l} \dot{x}_1 = x_2 \\ \dot{x}_2 = \phi(x, u) \\ y = x_1 \\ x = \begin{bmatrix} x_1 \\ x_2 \end{bmatrix} \end{array}\right\} \quad (1)$$

where $x_1$, $x_2$: State variables, u: Input variable, y: Output variable, $\phi(x, u)$: Nonlinear function of variables x, u. For example $x_1$ is position variable, $x_2$ is velocity variable and u is motor current variable. Output variable y and input variable u are supposed to be measurable. The high-gain observer which estimates state x is given by equation (2).

{Math. 2}

$$\left.\begin{array}{l} \dot{\hat{x}}_1 = \hat{x}_2 + H_1(y - \hat{x}_1) \\ \dot{\hat{x}}_2 = \phi_0(\hat{x}, u) + H_2(y - \hat{x}_1) \end{array}\right\} \quad (2)$$

where $\hat{x}_1$, $\hat{x}_2$: Estimates of state variables $x_1$, $x_2$, $H_1$, $H_2$: Gain constants of the high-gain observer which are larger than 1, $\phi_0$: Nominal function of $\phi$ used in high-gain observer computing. Estimation errors $\tilde{x}_1$, $\tilde{x}_2$ by using the high-gain observer (2) are given by equation (3) from equations (1) and (2).

{Math. 3}

$$\left.\begin{array}{l} \dot{\tilde{x}}_1 = -H_1 \tilde{x}_1 + \tilde{x}_2 \\ \dot{\tilde{x}}_2 = -H_2 \tilde{x}_1 + \delta(x, \hat{x}, u) \end{array}\right\} \quad (3)$$

$$\left.\begin{array}{l} \tilde{x}_1 = x_1 - \hat{x}_1 \\ \tilde{x}_2 = x_2 - \hat{x}_2 \\ \delta(x, \hat{x}, u) = \phi(x, u) - \phi_0(\hat{x}, u) \end{array}\right\} \quad (4)$$

where $\delta$: Model error between the nominal model $\phi_0$ and the true but actually unobtainable function $\phi$. Introducing a positive parameter $\epsilon$ much smaller than 1, $H_1$, $H_2$ are given by equation (5).

{Math. 4}

$$H_1 = \frac{K_1}{\epsilon} \quad (5)$$
$$H_2 = \frac{K_2}{\epsilon^2}$$

As $H_1$, $H_2$ in equation (5) are large gain constants, equation (2) is called by a high-gain observer. By using equation (5), equation (3) is rewritten as equation (6).

{Math. 5}

$$\left.\begin{array}{l} \dot{\tilde{x}}_1 = -K_1(\tilde{x}_1/\epsilon) + \tilde{x}_2 \\ \dot{\tilde{x}}_2 = -(K_2/\epsilon)(\tilde{x}_1/\epsilon) + \delta(x, \tilde{x}, u) \end{array}\right\} \quad (6)$$

The estimation errors $\tilde{x}_1$, $\tilde{x}_2$ are replaced by new variables $\eta_1$, $\eta_2$ as written in equation (7).

{Math. 6}

$$\eta_1 = \frac{\tilde{x}_1}{\epsilon} \quad (7)$$
$$\eta_2 = \tilde{x}_2$$

By using equation (7), equation (6) is rewritten as equation (8).

{Math. 7}

$$\left.\begin{array}{l} \epsilon \dot{\eta}_1 = -K_1 \eta_1 + \eta_2 \\ \epsilon \dot{\eta}_2 = -K_2 \eta_1 + \epsilon \delta(x, \tilde{x}, u) \end{array}\right\} \quad (8)$$

As the parameter $\epsilon$ is much smaller than 1, the effects of model error $\delta$ on the estimation errors $\eta_1$, $\eta_2$ can be made small enough by equation (8). Thus by using the high-gain observer for a model which has screw back pressure as a state variable, the above requirement (A) "High-precision detection" for a pressure detecting means (paragraph {0028}) is satisfied.

When the effects of the model error $\delta$ on the estimation errors $\eta_1$, $\eta_2$ are neglected, equation (8) is rewritten as equation (9).

{Math. 8}

$$\begin{bmatrix} \dot{\eta}_1 \\ \dot{\eta}_2 \end{bmatrix} = \frac{1}{\epsilon} \begin{bmatrix} -K_1 & 1 \\ -K_2 & 0 \end{bmatrix} \begin{bmatrix} \eta_1 \\ \eta_2 \end{bmatrix} = \frac{1}{\epsilon} A \begin{bmatrix} \eta_1 \\ \eta_2 \end{bmatrix} \quad (9)$$

$$A = \begin{bmatrix} -K_1 & 1 \\ -K_2 & 0 \end{bmatrix} \quad (10)$$

When $K_1$, $K_2$ are decided so that conjugate complex eigenvalues $\lambda_1$, $\bar{\lambda}_1$ of matrix A have a negative real part, that is, $Re(\lambda_1)=Re(\overline{\lambda}_1)<0$, the estimate errors $\eta_1$, $\eta_2$ are given by equation (11) with initial values $\eta_{10}$, $\eta_{20}$.

{Math. 9}

$$\left.\begin{array}{l}\eta_1(t) = \exp\left(\frac{Re(\lambda_1)}{\varepsilon}t\right)(C_1(t)\eta_{10} + C_2(t)\eta_{20})\\ \eta_2(t) = \exp\left(\frac{Re(\lambda_1)}{\varepsilon}t\right)(C_3(t)\eta_{10} + C_4(t)\eta_{20})\end{array}\right\} \quad (11)$$

where t: Time variable, $C_1(t) \sim C_4(t)$: Sinusoidal components with constant amplitudes and constant frequency decided by $K_1$, $K_2$. As $Re(\lambda_1)<0$ and $\varepsilon$ is much smaller than 1, equation (11) reveals that the time responses $\eta_1(t)$, $\eta_2(t)$ of estimation errors tend to zero rapidly. In other words, by using high-gain observer equation (2), the above requirement (B) "Detection with small time-lag" for a pressure detecting means (paragraph {0028}) can be satisfied.

Although estimates $\hat{x}_1$, $\hat{x}_2$ of all state variables are obtained by equation (2), it is sufficient to get only the estimate $\hat{x}_2$ because $x_1$ is detected as output y. Then the high-gain observer is given by equation (12).

{Math. 10}

$$\dot{\hat{x}}_2 = -H\hat{x}_2 + H\dot{y} + \phi_0(\hat{x}_2,y,u) \quad (12)$$

where H: Gain constant of the high-gain observer which is larger than 1. As time-derivative term of output y is included in the right-hand side of equation (12), equation (12) cannot be used as computing equation by itself. But it can be shown that the high-gain observer by equation (12) satisfies the above two requirements (A) and (B) (paragraph {0028}). Equation (13) is given from the third equation in equation (1).

{Math. 11}

$$\dot{y}=\dot{x}_1=x_2 \quad (13)$$

Equation (14) is given by using equations (12) and (13).

{Math. 12}

$$\dot{\hat{x}}_2 = -H\hat{x}_2 + Hx_2 + \phi_0(\hat{x}_2,y,u) \quad (14)$$

By using the second equation of equation (1), equation (15) is given from equation (14).

{Math. 13}

$$\dot{\tilde{x}}_2 = -H\tilde{x}_2 + \delta(x,\tilde{x}_2,y,u) \quad (15)$$

$$\left.\begin{array}{l}\tilde{x}_2 = x_2 - \hat{x}_5 \\ \delta(x,\tilde{x}_2,y,u) = \phi(x,u) - \phi_0(\hat{x}_2,y,u)\end{array}\right\} \quad (16)$$

Gain constant H is given by equation (17) by introducing a positive parameter $\varepsilon$ much smaller than 1.

{Math. 14}

$$H = \frac{K}{\varepsilon}(K>0) \quad (17)$$

By using equation (17), equation (15) is rewritten as equation (18).

{Math. 15}

$$\varepsilon\dot{\tilde{x}}_2 = -K\tilde{x}_2 + \varepsilon\delta(x,\tilde{x}_2,y,u) \quad (18)$$

As $\varepsilon$ is much smaller than 1, the effect of model error $\delta$ on the estimation error $\tilde{x}_2$ can be made small enough from equation (18). Therefore by using the high-gain observer for a model which has screw back pressure as a state variable, the above requirement (A) "High-precision detection" for a pressure detecting means (paragraph {0028}) can be satisfied.

When the effect of model error $\delta$ on the estimation error $\tilde{x}_2$ is neglected, equation (18) is rewritten as equation (19).

{Math. 16}

$$\varepsilon\dot{\tilde{x}}_2 = -K\tilde{x}_2 \quad (19)$$

The estimation error $\tilde{x}_2$ is given by equation (20) from equation (19).

{Math. 17}

$$\tilde{x}_2(t) = \exp\left(-\frac{K}{\varepsilon}t\right)\tilde{x}_{20} \quad (20)$$

where $\tilde{x}_{20}$: Initial value of $\tilde{x}_2$. As $\varepsilon$ is much smaller than 1, equation (20) reveals that the time response $\tilde{x}_2(t)$ of estimation error tends to zero rapidly. In other words, by using high-gain observer equation (12), the above requirement (B) "Detection with small time-lag" for a pressure detecting means (paragraph {0028}) can be satisfied. As in equation (12) the minimum number of state variables to be estimated are included and the measurable state variables are excluded, equation (12) is called by a reduced-order high-gain observer because the order of observer equation (12) is lower than that of observer equation (2).

Then a procedure to modify equation (12) is shown so that the time-derivative term of output y is not appeared. A new variable $\hat{w}$ is given by equation (21).

{Math. 18}

$$\hat{w}=\hat{x}_2-Hy \quad (21)$$

By using equation (21), equation (12) is rewritten as equation (22).

{Math. 19}

$$\dot{\hat{w}} = -H(\hat{w}+Hy) + \phi_0(\hat{w},y,u) \quad (22)$$

Variable $\hat{w}$ is calculated by equation (22) and estimate $\hat{x}_2$ is obtained by equation (23).

{Math. 20}

$$\hat{x}_2 = \hat{w}+Hy \quad (23)$$

Procedures of applying a high-gain observer for a model of electric-motor driven injection molding machines which has screw back pressure as a state variable are described in detail in Example 1 and Example 2 to be hereinafter described.

Advantageous Effects of Invention

By applying a high-gain observer for a model of electric-motor driven injection molding machines which has screw back pressure as a state variable, a high-precision pressure detection with small time-lag becomes possible without using a pressure detector. By using the high-gain observer the requirement for a plasticizing controller of electric-motor driven injection molding machines that an adequate screw back pressure is applied to the melted polymer stored at the end of the barrel during the plasticizing process can be satisfied without using a pressure detector and also the five disadvantages described in Background Art (paragraph {0024}) can be avoided.

DESCRIPTION OF EMBODIMENT

Hereinafter, the embodiment of the present invention on the plasticizing controller of electric-motor driven injection molding machines is described based on the drawings.

Example 1

Figure 3:
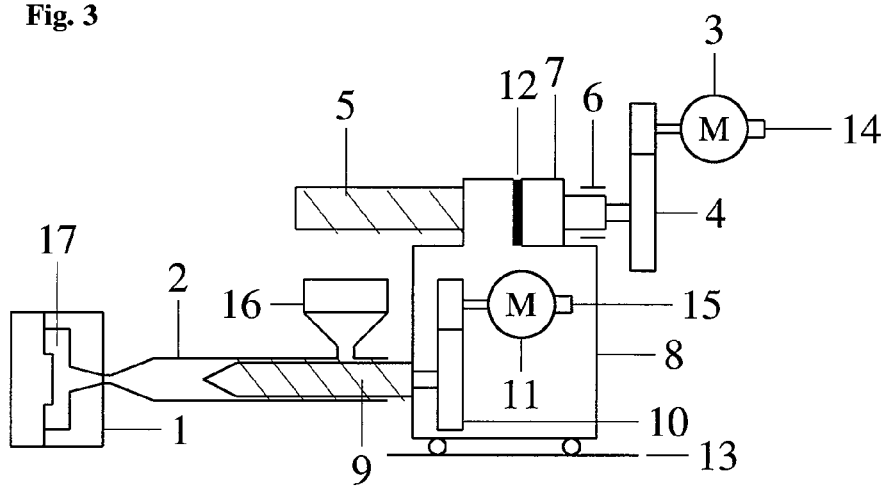
FIG. 3 is a view which shows an existing plasticizing mechanism of an electric-motor driven injection molding machine.
Figure 5:
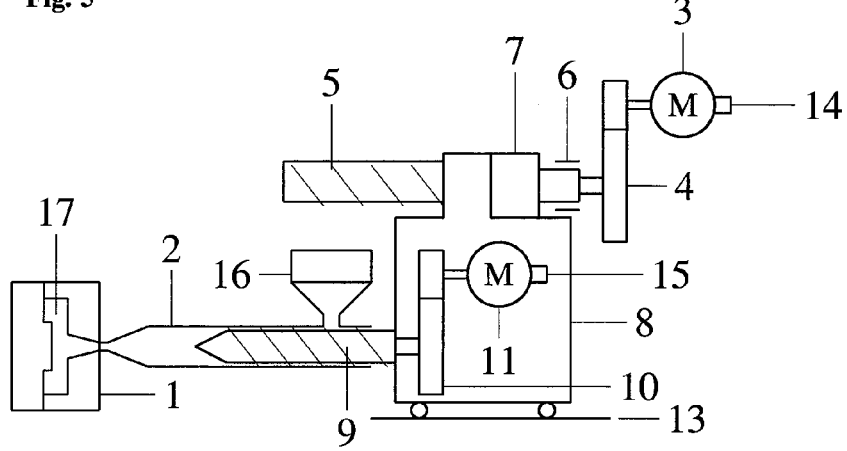
FIG. 5 is a view which shows a plasticizing mechanism of an electric-motor driven injection molding machine according to an embodiment of the present invention.

FIG. 5 is a view which shows a plasticizing mechanism of an electric-motor driven injection molding machine without using a pressure detector. As the mechanism in FIG. 5 consists of the parts with the same reference signs as in FIG. 3 except a pressure detector 12, explanations of FIG. 5 are replaced by those of FIG. 3 described in Background Art (paragraph {0004}~{0008}).

Figure 1:
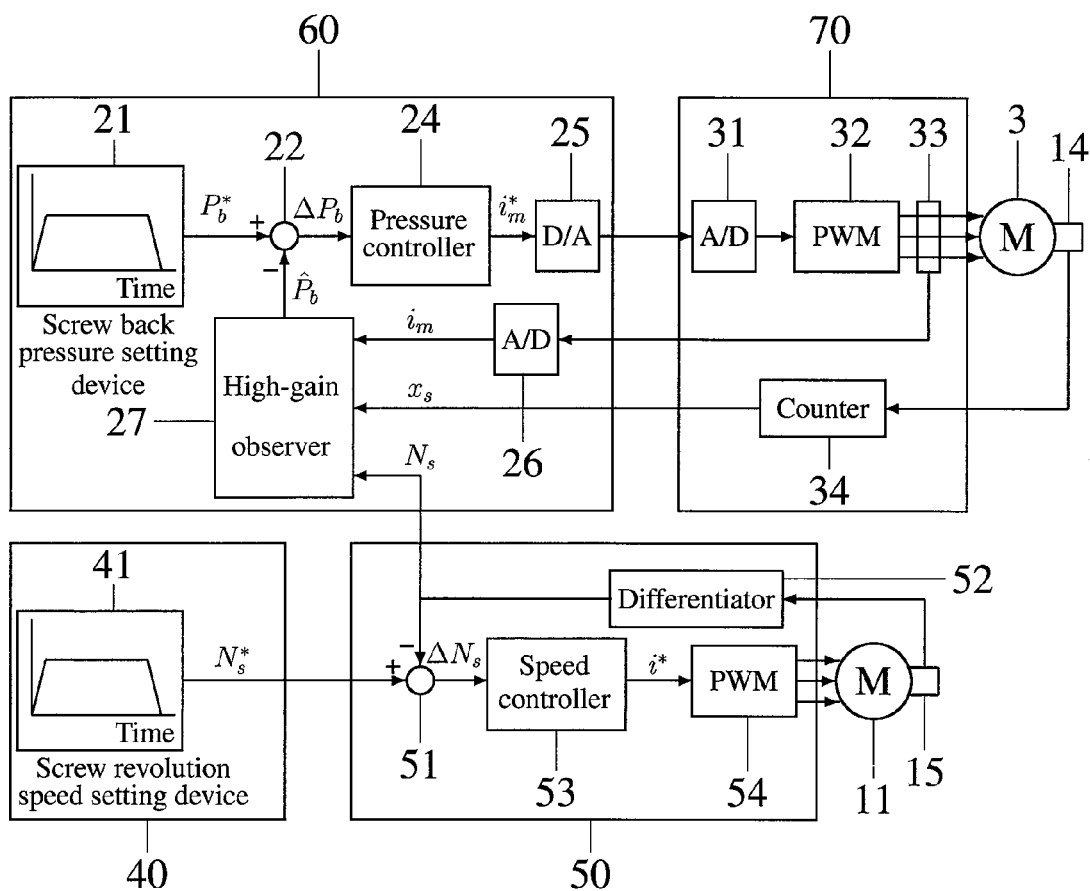
FIG. 1 is an explanation drawing of working example 1 which shows a block diagram of a plasticizing controller for an electric-motor driven injection molding machine according to an embodiment of the present invention.

FIG. 1 is an example of a plasticizing controller of an electric-motor driven injection molding machine using a high-gain observer as a screw back pressure detecting means according to an embodiment of the present invention and shows a block diagram of the plasticizing controller. The plasticizing controller consists of a back pressure controller 60 which contains a high-gain observer 27, a motor controller (servoamolifier) for injection 70, a screw revolution speed controller 40 and a motor controller (servoamplifier) for plasticization 50.

The back pressure controller 60 executes a control algorithm at a constant time interval and feeds a discrete-time control demand to the motor controller for injection 70. The back pressure controller 60 consists of a screw back pressure setting device 21, a subtracter 22, a pressure controller 24, a digital/analog (D/A) converter 25, an analog/digital (A/D) converter 26 and a high-gain observer 27.

The screw back pressure setting device 21 feeds a time sequence of screw back pressure command $P^*_b$ to the subtracter 22.

The actual motor current $i_m$ detected in the motor controller for injection 70 is fed to the high-gain observer 27 through the A/D converter 26. The position signal $x_s$ of the screw 9 is fed to the high-gain observer 27 from the motor controller for injection 70. The signal $x_s$ is obtained by accumulating the pulse train from a rotary encoder 14 mounted on the servomotor for injection 3. The screw revolution speed $N_s$ from the motor controller for plasticization 50 is fed to the high-gain observer 27. The high-gain observer 27 executes discrete-time arithmetic expressions which are obtained from a mathematical model of the plasticizing mechanism and outputs an estimate of screw back pressure $\hat{P}_b$ and an estimate of screw backward speed (not shown in FIG. 1) by using the input signals of $i_m$, $x_s$ and $N_s$.

The estimate of screw back pressure $\hat{P}_b$ is fed to the subtracter 22. The subtracter 22 calculates the control deviation $\Delta P_b$ from screw back pressure command $P^*_b$ by equation (24).

{Math. 21}

$$\Delta P_b = P_b^* - P_b \qquad (24)$$

The subtracter 22 feeds the control deviation $\Delta P_b$ to the pressure controller 24.

The pressure controller 24 calculates a motor current demand $i^*_m$ from $\Delta P_b$ by using PID control algorithm and feeds the demand $i^*_m$ to the motor controller for injection 70 through the D/A converter 25.

The motor controller for injection 70 consists of an analog/digital (A/D) converter 31, a PWM device 32, a current transducer 33 of the servomotor for injection and a pulse counter 34. The motor controller for injection 70 is connected to the servomotor for injection 3 equipped with the rotary encoder 14.

The motor current demand $i^*_m$ for the servomotor for injection 3 from the back pressure controller 60 is fed to the A/D converter 31 and the A/D converter 31 feeds the demand $i^*_m$ to the PWM device 32.

The PWM device 32 applies three-phase voltage to the servomotor for injection 3 so that the servomotor for injection 3 is driven by the motor current demand $i^*_m$. The current transducer 33 of the servomotor 3 detects an actual motor current $i_m$ and the motor current $i_m$ is fed to the A/D converter 26 in the back pressure controller 60.

The pulse counter 34 accumulates the pulse train from the rotary encoder 14 mounted on the servomotor for injection 3, detects screw position $x_s$ and feeds the signal $x_s$ to the high-gain observer 27 in the back pressure controller 60.

The compositions and functions of the screw revolution speed controller 40 and the motor controller for plasticization 50 are already described in detail in Background Art (paragraph {0022}~{0023}). However, in FIG. 1 the screw revolution speed $N_s$ is fed to the high-gain observer 27 from the differentiator 52 in the motor controller for plasticization 50.

The high-gain observer 27 outputs estimate $\hat{P}_b$ of screw back pressure and estimate $\hat{v}$ of screw backward speed by using screw position signal $x_s$, actual motor current signal $i_m$ of the servomotor for injection 3 and screw revolution speed signal $N_s$. The mathematical model of the plasticizing mechanism shown in FIG. 5 is derived as follows, which is necessary to design the high-gain observer 27. A motion equation of the servomotor for injection 3 axis is given by equation (25).

{Math. 22}

$$(J_M + J_{G1})\frac{d\omega_m}{dt} = T_M - r_1 F \tag{25}$$

where $J_M$: Moment of inertia of motor itself, $J_{G1}$: Moment of inertia of motor-side gear, $w_m$: Angular velocity of motor, $T_M$: Motor torque, $r_1$: Radius of motor-side gear, F: Transmission force of reduction gear, t: Time variable. A motion equation of the ball screw 5 axis is given by equation (26).

{Math. 23}

$$(J_S + J_{G2})\frac{d\omega_s}{dt} = r_2 F - T_a \tag{26}$$

where $J_S$: Moment of inertia of ball screw axis, $J_{G2}$: Moment of inertia of load-side gear, $w_s$: Angular velocity of ball screw axis, $r_2$: Radius of load-side gear, $T_\alpha$: Ball screw drive torque. A motion equation of the moving part 8 is given by equations (27) and (28).

{Math. 24}

$$\frac{W}{g}\frac{dv}{dt} = F_a - F_L - \mu W \frac{v}{|v|} \tag{27}$$

$$\frac{dx_s}{dt} = v \tag{28}$$

where W: Weight of the moving part 8, g: Gravity acceleration, v: Velocity of the screw (the moving part), $x_s$: Screw position (initial position $x_s=0$), $F_\alpha$: Drive force of the ball screw, $F_L$: Applied force by polymer to the screw, $\mu$: Friction coefficient at the slider. A relation between ball screw drive force $F_\alpha$ and ball screw drive torque $T_\alpha$, is given by equation (29).

{Math. 25}

$$T_a = \frac{l}{2\pi}\frac{1}{\eta} F_a \tag{29}$$

where l: Ball screw lead, $\eta$: Ball screw efficiency. Equations among v, $w_s$ and $w_m$ are given by equation (30).

{Math. 26}

$$v = \frac{l}{2\pi}\omega_s = \frac{l}{2\pi}\frac{r_1}{r_2}\omega_m \tag{30}$$

Applied force to the screw $F_L$ is given by equation (31).

{Math. 27}

$$F_L = A_s P_b + C_{mt}\frac{v}{|v|}|v|^\gamma \tag{31}$$

where $A_s$: Screw section area, $P_b$: Screw back pressure, $C_{mt}$: Friction coefficient between the screw and the barrel surface, $\gamma$: Velocity power coefficient. A dynamic equation of screw back pressure $P_b$ is given by equations (32) and (33).

{Math. 28}

$$\frac{V_b}{\beta}\frac{dP_b}{dt} = A_s v + Q_f \tag{32}$$

$$V_b = V_{b0} - A_s x_s \tag{33}$$

where $V_b$: Polymer volume at the end of a barrel, $V_{b0}$: Initial volume of $V_b$ at the start of plasticizing process, $Q_f$: Plasticizing rate (supply flow rate of melted polymer from the screw to the stored polymer at the end of a barrel), $\beta$: Bulk modulus of polymer. The characteristics of the servomotor for injection 3 is given by equation (34).

{Math. 29}

$$T_M = K_T i_m \tag{34}$$

where $K_T$: Motor torque coefficient of the servomotor for injection 3, $i_m$: Motor current of the servomotor for injection 3. By using equations (25), (26) and (30) and deleting $w_s$ and F, equation (35) is derived.

{Math. 30}

$$\left\{J_M + J_{G1} + (J_S + J_{G2})\left(\frac{r_1}{r_2}\right)^2\right\}\frac{d\omega_m}{dt} = T_M - \frac{r_1}{r_2}T_a \tag{35}$$

By using equations (27), (29), (30) and (35) and deleting $T_\alpha$ and $F_\alpha$, equation (36) is derived.

{Math. 31}

$$J_{eq}\frac{d\omega_m}{dt} = T_M - \frac{l}{2\pi}\frac{1}{\eta}\frac{r_1}{r_2}\left(F_L + \mu W \frac{v}{|v|}\right) \tag{36}$$

$$J_{eq} = J_M + J_{G1} + (J_S + J_{G1})\left(\frac{r_1}{r_2}\right)^2 + \frac{W}{g}\left(\frac{r_1}{r_2}\right)^2\left(\frac{l}{2\pi}\right)^2\frac{1}{\eta} \tag{37}$$

where $J_{eq}$: Reduced moment of inertia at motor axis. Equation (36) is the motion equation of total plasticizing mechanism converted to the motor axis. From equations (28) and (30), equation (38) is derived.

{Math. 32}

$$\frac{dx_s}{dt} = \frac{r_1}{r_2}\frac{l}{2\pi}\omega_m \tag{38}$$

From equations (31), (34) and (36), the motion equation of a linear motion of the screw is given by equation (39).

{Math. 33}

$$J_{eq}\frac{d\omega_m}{dt} = K_T i_m - \frac{l}{2\pi}\frac{1}{\eta}\frac{r_1}{r_2}\left\{A_s P_b + C_{mt}\frac{v}{|v|}|v|^\gamma + \mu W \frac{v}{|v|}\right\} \quad (39)$$

Equation (33) is rewritten as equation (40).

{Math. 34}

$$V_b = V_{b0} - A_s x_s = A_s(x_0 - x_3) \quad (40)$$

where $x_0$: Initial length of the stored melted polymer at the end of the barrel at the start of plasticizing process. By using equations (30) and (40), equation (32) is rewritten as equation (41).

{Math. 35}

$$\frac{A_s(x_0 - x_s)}{\beta}\frac{dP_b}{dt} = A_s\frac{l}{2\pi}\frac{r_1}{r_2}\omega_m + Q_f \quad (41)$$

The variables in the above equations are made dimensionless. By using dimensionless variables, equation (38) is rewritten as equation (42).

{Math. 36}

$$\frac{d}{dt}\left[\frac{x_s}{x_{max}}\right] = \frac{l}{2\pi}\frac{r_1}{r_2}\frac{\omega_{max}}{x_{max}}\left[\frac{\omega_m}{\omega_{max}}\right] = \frac{v_{max}}{x_{max}}\left[\frac{\omega_m}{\omega_{max}}\right] \quad (42)$$

As a positive rotation of the servomotor for injection 3 corresponds to an injection direction of the screw 9, screw position $x_s$ and screw backward speed v become negative in the plasticizing process. $v_{max}(>0)$ is the maximum speed of screw backward movement in the plasticizing process. $w_{max}(>0)$ is the maximum revolution speed of the servomotor for injection corresponding to $v_{max} \cdot x_{max}(>0)$ is the maximum stroke of screw backward movement in the plasticizing process.

By using dimensionless variables, equation (39) is rewritten as equation (43).

{Math. 37}

$$J_{eq}\omega_{max}\frac{d}{dt}\left[\frac{\omega_m}{\omega_{max}}\right] = K_T i_{max}\left[\frac{i_m}{i_{max}}\right] - \frac{l}{2\pi}\frac{1}{\eta}\frac{r_1}{r_2}A_s P_{max}\left[\frac{P_b}{P_{max}}\right] - \frac{l}{2\pi}\frac{1}{\eta}\frac{r_1}{r_2}\frac{\left[\frac{\omega_m}{\omega_{max}}\right]}{\left|\left[\frac{\omega_m}{\omega_{max}}\right]\right|}\left\{C_{mt}v_{max}^\gamma\left|\left[\frac{\omega_m}{\omega_{max}}\right]\right|^\gamma + \mu W\right\} \quad (43)$$

where $i_{max}$: Motor current rating of the servomotor for injection 3, $P_{max}$: Maximum screw back pressure. In deriving equation (43), equation (44) is used.

{Math. 38}

$$\left[\frac{v}{v_{max}}\right] = \left[\frac{\omega_m}{\omega_{max}}\right] \quad (44)$$

Equation (43) is rewritten as equation (45).

{Math. 39}

$$\frac{d}{dt}\left[\frac{\omega_m}{\omega_{max}}\right] = \frac{T_{Mmax}}{J_{eq}\omega_{max}}\left[\frac{i_m}{i_{max}}\right] - \frac{l}{2\pi}\frac{1}{\eta}\frac{r_1}{r_2}\frac{A_s P_{max}}{J_{eq}\omega_{max}}\left[\frac{P_b}{P_{max}}\right] - \frac{l}{2\pi}\frac{1}{\eta}\frac{r_1}{r_2}\frac{1}{J_{eq}\omega_{max}}\frac{\left[\frac{\omega_m}{\omega_{max}}\right]}{\left|\left[\frac{\omega_m}{\omega_{max}}\right]\right|}\left\{C_{mt}v_{max}^\gamma\left|\left[\frac{\omega_m}{\omega_{max}}\right]\right|^\gamma + \mu W\right\} \quad (45)$$

where $T_{Mmax} = K_T i_{max}$: Motor rating torque of the servomotor for injection 3.

By using dimensionless variables, equation (41) is rewritten as equation (46).

{Math. 40}

$$\frac{1}{\beta}A_s x_{max} P_{max}\left\{\left[\frac{x_0}{x_{max}}\right] - \left[\frac{x_s}{x_{max}}\right]\right\}\frac{d}{dt}\left[\frac{P_b}{P_{max}}\right] = A_s v_{max}\left\{\left[\frac{\omega_m}{\omega_{max}}\right] + \frac{v_{fmax}}{v_{max}}\left[\frac{Q_f}{Q_{max}}\right]\right\} \quad (46)$$

where $Q_{max} = A_s v_{fmax}$: Maximum plasticizing rate. $v_{fmax}(>0)$ is the screw backward speed corresponding to the maximum plasticizing rate $Q_{max}$. Equation (46) is rewritten as equation (47).

{Math. 41}

$$\frac{d}{dt}\left[\frac{P_b}{P_{max}}\right] = \frac{\beta}{\left[\frac{x_0}{x_{max}}\right] - \left[\frac{x_s}{x_{max}}\right]}\frac{v_{max}}{x_{max}P_{max}}\left\{\left[\frac{\omega_m}{\omega_{max}}\right] + \frac{v_{fmax}}{v_{max}}\left[\frac{Q_f}{Q_{max}}\right]\right\} \quad (47)$$

In general dimensionless plasticizing rate $[Q_f/Q_{max}]$ is a function of dimensionless screw back pressure $[P_b/P_{max}]$ and dimensionless screw revolution speed $[N_s/N_{max}]$ given by equation (48). $N_{max}$ is the maximum screw revolution speed.

{Math. 42}

$$\left[\frac{Q_f}{Q_{max}}\right] = f\left(\left[\frac{P_b}{P_{max}}\right], \left[\frac{N_s}{N_{max}}\right]\right) \quad (48)$$

The mathematical model of the plasticizing mechanism necessary for designing the high-gain observer 27 is given by equations (49), (50) and (51) by using equations (42), (45), (47) and (48).

{Math. 43}

$$\frac{d}{dt}\left[\frac{x_s}{x_{max}}\right] = \frac{v_{max}}{x_{max}}\left[\frac{\omega_m}{\omega_{max}}\right] \quad (49)$$

-continued $$\frac{d}{dt}\left[\frac{\omega_m}{\omega_{max}}\right] = \frac{T_{Mmax}}{J_{eq}\omega_{max}}\left[\frac{i_m}{i_{max}}\right] - \frac{l}{2\pi}\frac{1}{\eta}\frac{r_1}{r_2}\frac{A_s P_{max}}{J_{eq}\omega_{max}}\left[\frac{P_b}{P_{max}}\right] - \quad (50)$$

$$\frac{l}{2\pi}\frac{1}{\eta}\frac{r_1}{r_2}\frac{1}{J_{eq}\omega_{max}}\frac{\left[\frac{\omega_m}{\omega_{max}}\right]}{\left|\left[\frac{\omega_m}{\omega_{max}}\right]\right|}\left\{C_{mt}v_{max}^\gamma\left|\left[\frac{\omega_m}{\omega_{max}}\right]\right|^\gamma + \mu W\right\}$$

$$\frac{d}{dt}\left[\frac{P_b}{P_{max}}\right] = \quad (51)$$

$$\frac{\beta}{\left[\frac{x_0}{x_{max}}\right] - \left[\frac{x_s}{x_{max}}\right]}\frac{v_{max}}{x_{max}P_{max}}\left\{\left[\frac{\omega_m}{\omega_{max}}\right] + \frac{v_{fmax}}{v_{max}}f\left(\left[\frac{P_b}{P_{max}}\right], \left[\frac{N_s}{N_{max}}\right]\right)\right\}$$

When the dimensionless plasticizing rate $[Q_f/Q_{max}]$ is assumed to be proportional to the screw revolution speed, equation (48) is given by equation (52).

{Math. 44}

$$f\left(\left[\frac{P_b}{P_{max}}\right], \left[\frac{N_s}{N_{max}}\right]\right) = \left[\frac{N_s}{N_{max}}\right]g\left(\left[\frac{P_b}{P_{max}}\right]\right) \quad (52)$$

The following state variables $x_1$, $x_2$ and $x_3$ defined by equation (53) are introduced.

{Math. 45}

$$x_1 = \frac{x_s}{x_{max}}$$
$$x_2 = \frac{\omega_m}{\omega_{max}}$$
$$x_3 = \frac{P_b}{P_{max}}$$
$$(53)$$

Input variables $u_1$, $u_2$ defined by equation (54) are introduced. $u_1$, $u_2$ are measurable.

In the design of high-gain observer 27, the actual motor current $i_m$ of the servomotor for injection 3 is considered to be equal to motor current demand $i^*_m$ because the time lag between $i^*_m$ and $i_m$ is very small.

{Math. 46}

$$u_1 = \frac{i_m}{i_{max}} \quad u_2 = \frac{N_s}{N_{max}} \quad (54)$$

The state variable $x_1$ is supposed to be measurable and output variable y is defined by equation (55).

{Math. 47}

$$y = x_1 \quad (55)$$

The state equations representing equations (49), (50), (51), (52) and (55) are given by equations (56) and (57).

{Math. 48}

$$\left.\begin{array}{l}\dot{x}_1 = ax_2 \\ \dot{x}_2 = bx_3 + \chi(x_2) + cu_1 \\ \dot{x}_3 = \frac{d}{e - x_1}\{x_2 + qu_2 g(x_3)\} = \psi(x, u_2)\end{array}\right\} \quad (56)$$

$$y = x_1 \quad (57)$$

$$x = \begin{bmatrix} x_1 \\ x_2 \\ x_3 \end{bmatrix} \quad \chi(x_2) = \frac{x_2}{|x_2|}(h|x_2|^\alpha + p) \quad (58)$$

$$\left.\begin{array}{l}a = \frac{v_{max}}{x_{max}} \quad b = -\frac{l}{2\pi}\frac{1}{\eta}\frac{r_1}{r_2}\frac{A_s P_{max}}{J_{eq}\omega_{max}} \quad c = \frac{T_{Mmax}}{J_{eq}\omega_{max}} \quad d = \frac{\beta v_{max}}{x_{max}P_{max}} \\ e = \frac{x_0}{x_{max}} \quad h = -\frac{l}{2\pi}\frac{1}{\eta}\frac{r_1}{r_2}\frac{C_{mt}v_{max}^\gamma}{J_{eq}\omega_{max}} \quad p = -\frac{l}{2\pi}\frac{1}{\eta}\frac{r_1}{r_2}\frac{\mu W}{J_{eq}\omega_{max}} \quad q = \frac{v_{fmax}}{v_{max}}\end{array}\right\} \quad (59)$$

where $\chi(x_2)$ and $\psi(x, u_2)$ are nonlinear functions. Equations (56) and (57) are rewritten as equations (60) and (61) by using a vector x.

{Math. 49}

$$\dot{x} = Ax + \begin{bmatrix} 0 \\ \chi(x_2) + cu_1 \\ \psi(x, u_2) \end{bmatrix} \quad A = \begin{bmatrix} 0 & a & 0 \\ 0 & 0 & b \\ 0 & 0 & 0 \end{bmatrix} \quad (60)$$

$$y = \begin{bmatrix} 1 & 0 & 0 \end{bmatrix}x \quad (61)$$

New state variables $X_1$ and $X_2$ are introduced by equation (62).

{Math. 50}

$$X_1 = x_1 \quad (62)$$
$$X_2 = \begin{bmatrix} x_2 \\ x_3 \end{bmatrix}$$
$$X = \begin{bmatrix} X_1 \\ X_2 \end{bmatrix}$$

Equations (60) and (61) are rewritten as equations (63) and (64) by using equation (62).

{Math. 51}

$$\begin{bmatrix} \dot{X}_1 \\ \dot{X}_2 \end{bmatrix} = \begin{bmatrix} A_{11} & A_{12} \\ A_{21} & A_{22} \end{bmatrix} \begin{bmatrix} X_1 \\ X_2 \end{bmatrix} + \begin{bmatrix} B_1 \\ B_2 \end{bmatrix} \phi(X, u) \quad (63)$$

$$y = X_1 \quad (64)$$

$$\left. \begin{array}{l} A_{11} = 0 \quad A_{12} = [a \ 0] \quad A_{21} = \begin{bmatrix} 0 \\ 0 \end{bmatrix} A_{22} = \begin{bmatrix} 0 & b \\ 0 & 0 \end{bmatrix} \\ B_1 = [0 \ 0] \quad B_2 = \begin{bmatrix} 1 & 0 \\ 0 & 1 \end{bmatrix} \quad \phi(X, u) = \begin{bmatrix} \chi(X_2) + cu_1 \\ \psi(X, u_2) \end{bmatrix} \end{array} \right\} \quad (65)$$

Equation (63) is rewritten as equation (66).

{Math. 52}

$$\left. \begin{array}{l} \dot{X}_1 = A_{12} X_2 \\ \dot{X}_2 = A_{22} X_2 + \phi(X, u) \end{array} \right\} \quad (66)$$

As state variable $X_1 = x_1$ is measurable, it is not necessary to estimate state variable $X_1$. Therefore the high-gain observer 27 outputs the estimate of state variable $\hat{X}_2$ by using the screw position signal y, the actual motor current $u_1$ of the servomotor for injection and the screw revolution speed $u_2$. The estimate $\hat{X}_2$ is given by equation (67) (non patent literature NPL 2).

{Math. 53}

$$\dot{\hat{X}}_2 = (A_{22} - KA_{12})\hat{X}_2 + K\dot{y} + \phi_0(\hat{X}_2, y, u) \quad (67)$$

where K: Gain constant matrix of the high-gain observer 27 whose elements are larger than 1 in general, $\phi_0(\hat{X}_2, y, u)$: Nominal function of $\phi(X, u)$ used in equation (67). Equation (67) is rewritten by equation (68).

{Math. 54}

$$\dot{\hat{X}}_2 - K\dot{y} = (A_{22} - KA_{12})\hat{X}_2 + \phi_0(\hat{X}_2, y, u) \quad (68)$$

A new variable w is introduced by equation (69).

{Math. 55}

$$\hat{w} = \hat{X}_2 - Ky \quad (69)$$

The estimate $\hat{X}_2$ is given by equations (70) and (71) by using equations (68) and (69).

{Math. 56}

$$\dot{\hat{w}} = (A_{22} - KA_{12})(\hat{w} + Ky) + \phi_0(\hat{w}, y, u) \quad (70)$$

$$\hat{X}_2 = \hat{w} + Ky \quad (71)$$

A positive parameter $\epsilon$ much smaller than 1 is introduced and the gain matrix K is given by equation (72).

{Math. 57}

$$K = \begin{bmatrix} K_1/\epsilon \\ K_2/\epsilon^2 \end{bmatrix} \quad (72)$$

Equation (70) is rewritten as equation (73) from equations (65) and (72).

{Math. 58}

$$\begin{bmatrix} \dot{\hat{w}}_1 \\ \dot{\hat{w}}_2 \end{bmatrix} = \begin{bmatrix} -aK_1/\epsilon & b \\ -aK_2/\epsilon^2 & 0 \end{bmatrix} \begin{bmatrix} \hat{w}_1 \\ \hat{w}_2 \end{bmatrix} + \begin{bmatrix} (-aK_1^2 + bK_2)/\epsilon^2 \\ -aK_1K_2/\epsilon^3 \end{bmatrix} y + \begin{bmatrix} \chi_0(\hat{w}_1, y) + cu_1 \\ \psi_0(\hat{w}, y, u_2) \end{bmatrix} \quad (73)$$

where $\chi_0(\hat{w}_1, y)$ and $\psi_0(\hat{w}, y, u_2)$ are nominal functions of $\chi(X_2)$ and $\psi(X, u_2)$, respectively.

New variables $\hat{\eta}_1, \hat{\eta}_2$ are given by equation (74).

{Math. 59}

$$\hat{\eta} = \begin{bmatrix} \hat{\eta}_1 \\ \hat{\eta}_2 \end{bmatrix} = \begin{bmatrix} \epsilon & 0 \\ 0 & \epsilon^2 \end{bmatrix} \begin{bmatrix} \hat{w}_1 \\ \hat{w}_2 \end{bmatrix} = D \begin{bmatrix} \hat{w}_1 \\ \hat{w}_2 \end{bmatrix} \quad (74)$$

$$D = \begin{bmatrix} \epsilon & 0 \\ 0 & \epsilon^2 \end{bmatrix}$$

Equation (73) is rewritten as equation (75) by using equation (74).

{Math. 60}

$$\begin{bmatrix} \dot{\hat{\eta}}_1 \\ \dot{\hat{\eta}}_2 \end{bmatrix} = \frac{1}{\epsilon}(A_{22} - K_0 A_{12})\left\{ \begin{bmatrix} \hat{\eta}_1 \\ \hat{\eta}_2 \end{bmatrix} + K_0 y \right\} + \begin{bmatrix} \epsilon \chi_0(\hat{\eta}_1, y) + \epsilon cu_1 \\ \epsilon^2 \psi_0(\hat{\eta}, y, u_2) \end{bmatrix} \quad (75)$$

$$K_0 = \begin{bmatrix} K_1 \\ K_2 \end{bmatrix}$$

Equation (76) is given from equation (74).

{Math. 61}

$$\begin{bmatrix} \hat{w}_1 \\ \hat{w}_2 \end{bmatrix} = D^{-1} \begin{bmatrix} \hat{\eta}_1 \\ \hat{\eta}_2 \end{bmatrix} \quad (76)$$

Equation (72) is rewritten as equation (77).

{Math. 62}

$$K = D^{-1} K_0 \quad (77)$$

By using equations (76) and (77), equation (71) is rewritten as equation (78).

{Math. 63}

$$\hat{x}_2 = \begin{bmatrix} \hat{x}_2 \\ \hat{x}_3 \end{bmatrix} = D^{-1}\begin{bmatrix} \hat{\eta}_1 \\ \hat{\eta}_2 \end{bmatrix} + D^{-1}K_0 y = \begin{bmatrix} (\hat{\eta}_1 + K_1 y)/\varepsilon \\ (\hat{\eta}_2 + K_2 y)/\varepsilon^2 \end{bmatrix} \quad (78)$$

Thus the estimates of state variables $\hat{x}_2, \hat{x}_3$ are obtained by the high-gain observer 27.

From equations (75) and (78), the calculation procedures are given by equations (79) and (80).

(1) Calculation Procedure 1

{Math. 64}

$$\begin{bmatrix} \dot{\hat{\eta}}_1 \\ \dot{\hat{\eta}}_2 \end{bmatrix} = \frac{1}{\varepsilon}(A_{22} - K_0 A_{12})\left\{\begin{bmatrix} \hat{\eta}_1 \\ \hat{\eta}_2 \end{bmatrix} + K_0 y\right\} + \begin{bmatrix} \varepsilon \chi_0(\hat{\eta}_1, y) + \varepsilon c u_1 \\ \varepsilon^2 \psi_0(\hat{\eta}_1, \hat{\eta}_2, y, u_2) \end{bmatrix} \quad (79)$$

(2) Calculation Procedure 2

{Math. 65}

$$\begin{bmatrix} \hat{x}_2 \\ \hat{x}_3 \end{bmatrix} = D^{-1}\begin{bmatrix} \hat{\eta}_1 \\ \hat{\eta}_2 \end{bmatrix} + D^{-1}K_0 y = \begin{bmatrix} (\hat{\eta}_1 + K_1 y)/\varepsilon \\ (\hat{\eta}_2 + K_2 y)/\varepsilon^2 \end{bmatrix} \quad (80)$$

By the calculation procedure 1, the estimates $\hat{\eta}_1$ and $\hat{\eta}_2$ are obtained and by the calculation procedure 2, the estimates $\hat{x}_2$ and $\hat{x}_3$ are obtained.

Then it is shown that the high-gain observer 27 as the pressure detecting means satisfies the following two requirements (A) and (B) described in Solution to Problem (paragraph {0028}).
(A) The detection means is high-precision.
(B) The detection means has very small time-lag.

If the nominal functions $\chi_0(\hat{\eta}_1, y)$ and $\psi_0(\hat{\eta}, y, u_2)$ in equation (79) are replaced with the true but actually unobtainable functions $\chi(\eta_1, y)$ and $\psi(\eta, y, u_2)$, the true values $\eta_1, \eta_2$ of the estimates $\hat{\eta}_1, \hat{\eta}_2$ may be obtained by equation (81).

{Math. 66}

$$\begin{bmatrix} \dot{\eta}_1 \\ \dot{\eta}_2 \end{bmatrix} = \frac{1}{\varepsilon}(A_{22} - K_0 A_{12})\left\{\begin{bmatrix} \eta_1 \\ \eta_2 \end{bmatrix} + K_0 y\right\} + \begin{bmatrix} \varepsilon \chi(\eta_1, y) + \varepsilon c u_1 \\ \varepsilon^2 \psi(\eta_1, \eta_2, y, u_2) \end{bmatrix} \quad (81)$$

Then the estimate errors $\tilde{\eta}_1 = \eta_1 - \hat{\eta}_1$ and $\tilde{\eta}_2 = \eta_2 - \hat{\eta}_2$ are obtained by equation (82) by using equations (79) and (81).

{Math. 67}

$$\begin{bmatrix} \dot{\tilde{\eta}}_1 \\ \dot{\tilde{\eta}}_2 \end{bmatrix} = \frac{1}{\varepsilon}(A_{22} - K_0 A_{12})\begin{bmatrix} \tilde{\eta}_1 \\ \tilde{\eta}_2 \end{bmatrix} + \begin{bmatrix} \varepsilon \delta_1(\eta_1, \hat{\eta}_1, y) \\ \varepsilon^2 \delta_2(\eta, \hat{\eta}, y, u_2) \end{bmatrix} \quad (82)$$

$$\delta_1(\eta_1, \hat{\eta}_1, y) = \chi(\eta_1, y) - \chi_0(\hat{\eta}_1, y)$$

$$\delta_2(\eta, \hat{\eta}, y, u_2) = \psi(\eta, y, u_2) - \psi_0(\hat{\eta}, y, u_2)$$

As $\varepsilon$ is much smaller than 1, the effects of model errors $\delta_1$ and $\delta_2$ on the estimation errors in $\tilde{\eta}_1$ and $\tilde{\eta}_2$ can be made small enough by equation (82). In other words, the high-gain observer 27 satisfies the above requirement (A) "High-precision detection" (paragraph {0028}) for screw back pressure estimate $\hat{x}_3$ and revolution speed of the servomotor for injection (screw backward speed) estimate $\hat{x}_2$ derived by equations (79) and (80).

When the effects of model errors $\delta_1$ and $\delta_2$ on the estimation errors are neglected in equation (82), equation (82) is rewritten as equation (83).

{Math. 68}

$$\begin{bmatrix} \dot{\tilde{\eta}}_1 \\ \dot{\tilde{\eta}}_2 \end{bmatrix} = \frac{1}{\varepsilon}A_0\begin{bmatrix} \tilde{\eta}_1 \\ \tilde{\eta}_2 \end{bmatrix} \quad (83)$$

$$A_0 = A_{22} - K_0 A_{12}$$

When matrix $K_0$ is decided so that the real part of conjugate complex eigenvalues $\lambda_1, \overline{\lambda}_1$ of matrix $A_0$ becomes negative, that is, $\text{Re}(\lambda_1) = \text{Re}(\overline{\lambda}_1) < 0$, the estimate errors $\tilde{\eta}_1, \tilde{\eta}_2$ are given by equation (84) with initial values $\tilde{\eta}_{10}, \tilde{\eta}_{20}$.

{Math. 69}

$$\tilde{\eta}_1(t) = \exp\left(\frac{Re(\lambda_1)}{\varepsilon}t\right)(C_1(t)\tilde{\eta}_{10} + C_2(t)\tilde{\eta}_{20})$$

$$\tilde{\eta}_2(t) = \exp\left(\frac{Re(\lambda_1)}{\varepsilon}t\right)(C_3(t)\tilde{\eta}_{10} + C_4(t)\tilde{\eta}_{20}) \quad (84)$$

where t: Time variable, $C_1(t) \sim C_4(t)$: Sinusoidal components with constant amplitudes and constant frequency decided by elements of matrix $A_0$. As $\text{Re}(\lambda_1) < 0$ and $\varepsilon$ is much smaller than 1, equation (84) reveals that the time responses $\tilde{\eta}_1(t), \tilde{\eta}_2(t)$ of the estimate errors tend to zero rapidly. In other words, the high-gain observer 27 satisfies the above requirement (B) "Detection with small time-lag" (paragraph {0028}) for screw back pressure estimate $\hat{x}_3$ and revolution speed of the servomotor for injection (screw backward speed) estimate $\hat{x}_2$ derived by equations (79) and (80).

As the back pressure controller 60 executes a control algorithm at a constant time interval $\Delta t$, the arithmetic expressions (79) and (80) of the high-gain observer 27 are transformed into the discrete-time arithmetic expressions (non patent literature NPL 3, NPL 4).

A new parameter a is introduced and the time interval $\Delta t$ is expressed by equation (85).

{Math. 70}

$$\Delta t = \alpha \varepsilon \quad (85)$$

Discrete-time equivalent of the continuous-time equation (79) can be found by using the standard method of forward rectangular rule which gives the relation between the Laplace-transform operator s representing time-derivative operation and z-transform operator z as follows.

{Math. 71}

$$s = \frac{z-1}{\Delta t} = \frac{z-1}{\alpha \varepsilon} \quad (86)$$

By using equation (86), equation (79) is rewritten as equation (87).

{Math. 72}

$$\frac{z-1}{\alpha\varepsilon}\begin{bmatrix}\hat{\eta}_1\\\hat{\eta}_2\end{bmatrix}=\frac{1}{\varepsilon}A_0\left\{\begin{bmatrix}\hat{\eta}_1\\\hat{\eta}_2\end{bmatrix}+K_0y\right\}+\begin{bmatrix}\varepsilon\chi_0(\hat{\eta}_1,y)+\varepsilon cu_1\\\varepsilon^2\psi_0(\hat{\eta}_1,\hat{\eta}_2,y,u_2)\end{bmatrix} \quad (87)$$

The discrete-time expression of equation (87) is given by equation (88).

{Math. 73}

$$\begin{bmatrix}\hat{\eta}_1(k+1)\\\hat{\eta}_2(k+1)\end{bmatrix}-\begin{bmatrix}\hat{\eta}_1(k)\\\hat{\eta}_2(k)\end{bmatrix}= \quad (88)$$

$$\alpha A_0\left\{\begin{bmatrix}\hat{\eta}_1(k)\\\hat{\eta}_2(k)\end{bmatrix}+K_0y(k)\right\}+\alpha\begin{bmatrix}\varepsilon^2\chi_0(k)+\varepsilon^2cu_1(k)\\\varepsilon^3\psi_0(k)\end{bmatrix}$$

$$\chi_0(k)=\frac{\hat{x}_2(k)}{|\hat{x}_2(k)|}(h|\hat{x}_2(k)|^\gamma+p) \quad (89)$$

$$\psi_0(k)=\frac{d}{e-y(k)}\{\hat{x}_2(k)+qu_2(k)g(\hat{x}_3(k))\}$$

where $\hat{\eta}_1(k)$, $\hat{\eta}_2(k)$, $\hat{x}_2(k)$, $\hat{x}_3(k)$: Estimates $\hat{\eta}_1(t_k)$, $\hat{\eta}_2(t_k)$, $\hat{x}_2(t_k)$, $\hat{x}_3(t_k)$ at a discrete-time $t_k$, $y(k)$, $u_1(k)$, $u_2(k)$: $y(t_k)$, $u_1(t_k)$, $u_2(t_k)$ at a discrete-time $t_k$, $\chi_0(k)$, $\psi_0(k)$: $\chi_0(t_k)$, $\psi_0(t_k)$ at a discrete-time $t_k$. $\chi_0(k)$ is given by equation (58) and $\psi_0(k)$ is given by the third equation of equation (56). Equation (88) is rewritten as equation (90).

{Math. 74}

$$\begin{bmatrix}\hat{\eta}_1(k+1)\\\hat{\eta}_2(k+1)\end{bmatrix}= \quad (90)$$

$$(I_2+\alpha A_0)\begin{bmatrix}\hat{\eta}_1(k)\\\hat{\eta}_2(k)\end{bmatrix}+\alpha A_0K_0y(k)+\alpha\begin{bmatrix}\varepsilon^2\chi_0(k)+\varepsilon^2cu_1(k)\\\varepsilon^3\psi_0(k)\end{bmatrix}$$

where $I_2$: 2×2 unit matrix.

The discrete-time equivalent of equation (80) is given by equation (91).

{Math. 75}

$$\begin{bmatrix}\hat{x}_2(k)\\\hat{x}_3(k)\end{bmatrix}=D^{-1}\begin{bmatrix}\hat{\eta}_1(k)\\\hat{\eta}_2(k)\end{bmatrix}+D^{-1}K_0y(k) \quad (91)$$

The high-gain observer 27 obtains screw back pressure estimate $\hat{x}_3(k)$ and revolution speed of the servomotor for injection (screw backward speed) estimate $\hat{x}_2(k)$ at a discrete-time $t_k$ by executing the arithmetic expressions of equations (90) and (91) at a time interval $\Delta t$. The high-gain observer 27 by equations (90) and (91) does not estimate the measurable state variable $x_1(k)$ (screw position) and estimates only necessary state variables $x_3(k)$ and $x_2(k)$ and so is called by a reduced-order high-gain observer.

Screw backward speed estimate $\hat{x}_2(k)$ obtained by the high-gain observer 27 can be used as a feedback signal for the screw backward speed control in the back pressure controller 60 and this is not shown in FIG. 1.

The results of computer simulation are shown when the high-gain observer 27 is used in the plasticizing process of an electric-motor driven injection molding machine. The constants of the mathematical model are as follows.

Maximum stroke of screw backward movement $x_{max}=20.0$ cm

Maximum screw backward speed $v_{max}=2.0$ cm/sec

Maximum screw back pressure $P_{max}=19.6$ MPa

Maximum revolution speed of the servomotor for injection $w_{max}=31.67$ rad/sec (302.4 rpm)

The constants a, b, c and d in equation (56) are expressed in equation (92).

{Math. 76}

$$\left.\begin{aligned}a&=0.1000\text{ sec}^{-1}\\b&=-4.757\text{ sec}^{-1}\\c&=24.576\text{ sec}^{-1}\\d&=9.177\text{ sec}^{-1}\end{aligned}\right\} \quad (92)$$

A monotone decreasing characteristics is used for the characteristics of function $g(\hat{P}_b/P_{max})$, which decides the plasticizing rate according to the value of $\hat{P}_b/P_{max}$ at the maximum screw revolution speed $N_{max}$. The gain matrix K of equation (72) used by the high-gain observer 27 is given by equation (93). The data $K_1=0.558$, $K_2=-0.00316$, $\varepsilon=0.09$ and $\Delta t=5$ msec are used.

{Math. 77}

$$K=\begin{bmatrix}6.2\\-0.39\end{bmatrix} \quad (93)$$

Figure 6:
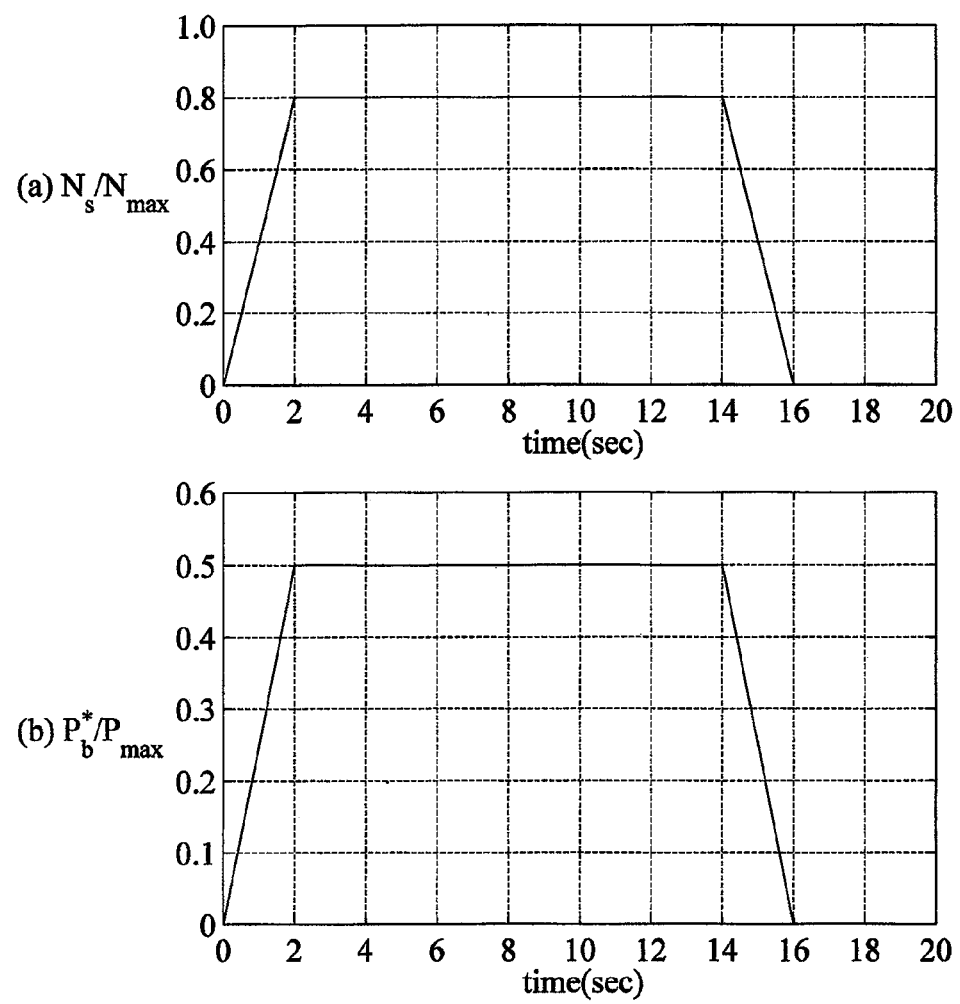
FIG. 6 is an explanation drawing of working examples 1 and 2 which shows computer simulation conditions of the plasticizing process according to an embodiment of the present invention.

FIG. 6 shows simulation conditions for the screw back pressure control. FIG. 6(*a*) shows a time sequence of screw revolution speed command $N^*_s=N_s$ from the screw revolution speed setting device 41. FIG. 6(*b*) shows a time sequence of screw back pressure command $P^*_b$ from the screw back pressure setting device 21.

Figure 7:
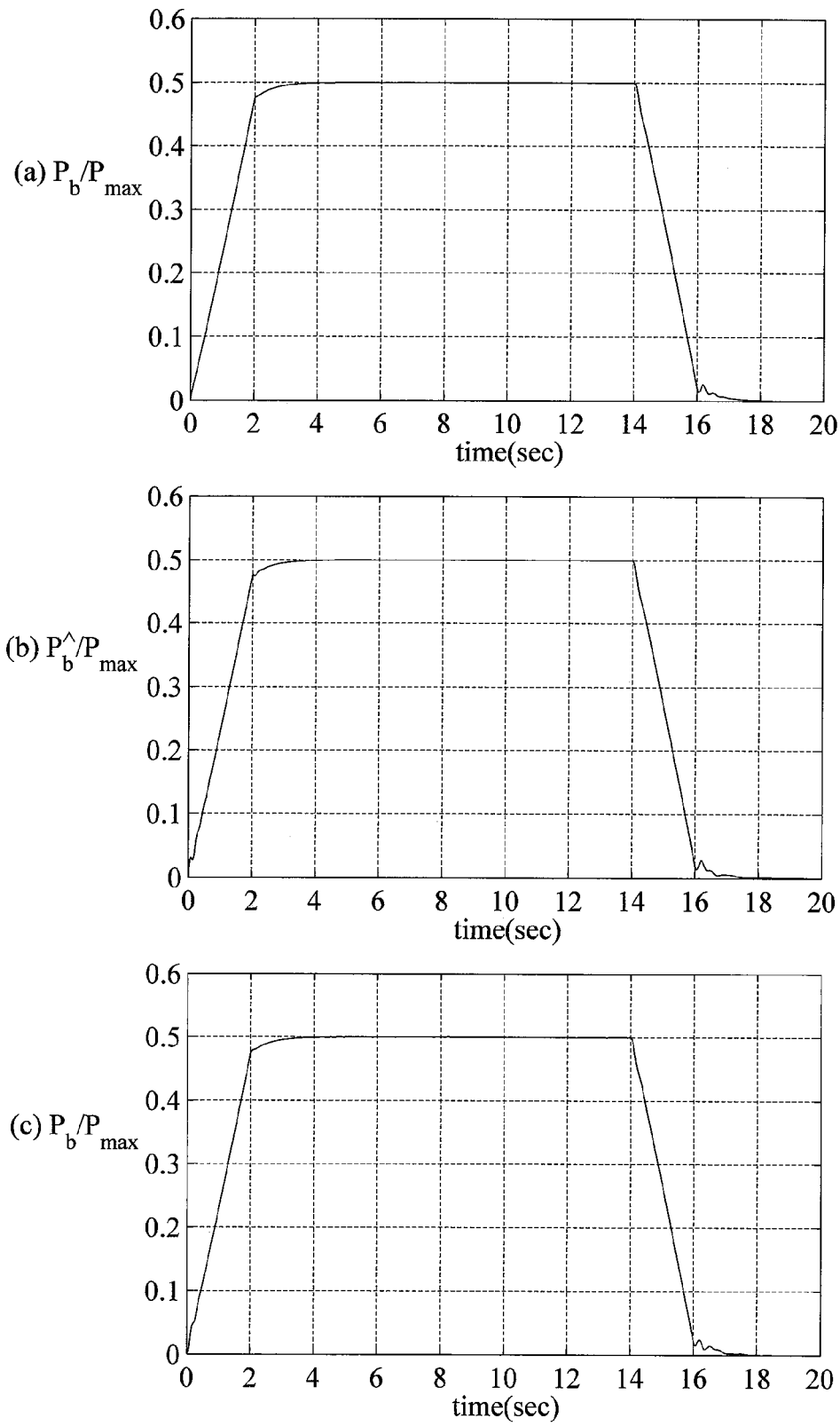
FIG. 7 is an explanation drawing of working example 1 which shows computer simulation results of screw back pressure estimation by the high-gain observer according to an embodiment of the present invention.

FIG. 7 shows time responses of screw back pressure at the control of screw back pressure. FIG. 7(*a*) shows the time response of screw back pressure when the control of screw back pressure $P_b$ is carried out by the plasticizing controller shown in FIG. 4 using the pressure detector 12. The time response of actual screw back pressure $P^*_b$ shown in FIG. 7(*a*) agrees well with that of screw back pressure command $P_b^*$ shown in FIG. 6(*b*).

Figure 4:
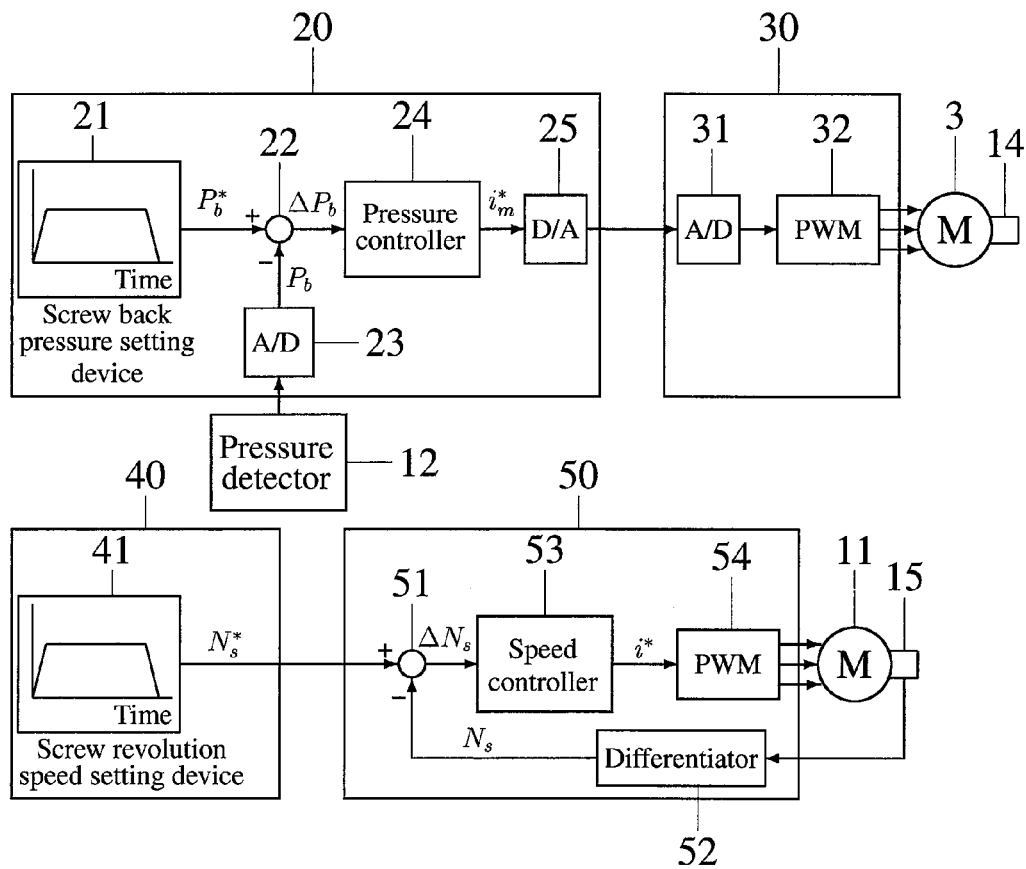
FIG. 4 is an explanation drawing which shows a block diagram of an existing plasticizing controller for an electric-motor driven injection molding machine.

When the high-gain observer 27 is supposed to be used under the control system shown in FIG. 4 and to calculate the estimate of screw back pressure $\hat{P}_b$ by using the screw position signal $y(t)$, the actual motor current signal $u_1(t)$ of the servomotor for injection and the screw revolution speed signal $u_2(t)$, FIG. 7(*b*) shows the time response of the estimated screw back pressure $\hat{P}/P_{max}$. As the time response of screw back pressure in FIG. 7(*a*) agrees well with that of estimated screw back pressure $\hat{P}_b$ in FIG. 7(*b*), it is revealed that the high-gain observer 27 can estimate the screw back pressure exactly with small time-lag.

FIG. 7(*c*) shows the time response of screw back pressure $P_b$ when the control of screw back pressure is carried out by the plasticizing controller shown in FIG. 1 using the high-gain observer 27. As the time response of screw back pressure $P_b$ shown in FIG. 7(*a*) using the pressure detector 12 agrees well with that of screw back pressure $P_b$ shown in FIG. 7(*c*), a good control of screw back pressure can be realized by the high-gain observer 27 without using the pressure detector 12.

Figure 8:
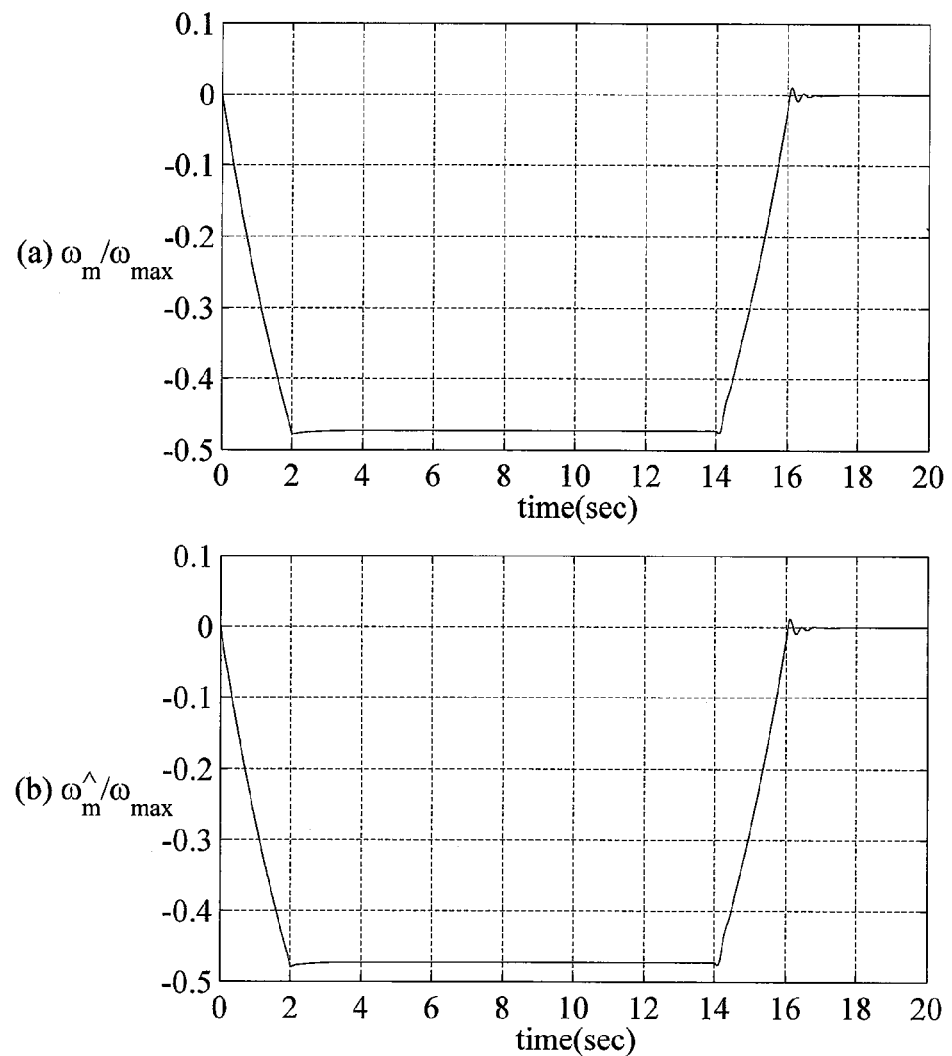
FIG. 8 is an explanation drawing of working example 1 which shows computer simulation results of screw backward speed estimation by the high-gain observer according to an embodiment of the present invention.

FIG. 8(*a*) shows the time response of revolution speed $w_m$ of the servomotor for injection (screw backward speed) when the control of screw back pressure $P_b$ is carried out by the plasticizing controller shown in FIG. 4 using the pressure detector 12. When the high-gain observer 27 is supposed to be used under the control system shown in FIG. 4, FIG. 8(*b*) shows the time response of the estimated revolution speed $\hat{\omega}_m$ of the servomotor for injection (screw backward speed). As the time response of revolution speed $\hat{\omega}_m$ in FIG. 8(*a*) agrees well with that of estimated revolution speed $\hat{\omega}_m$ in FIG. 8(*b*), it is revealed that the high-gain observer 27 can estimate the revolution speed of the servomotor for injection exactly with small time-lag.

Example 2

Figure 2:
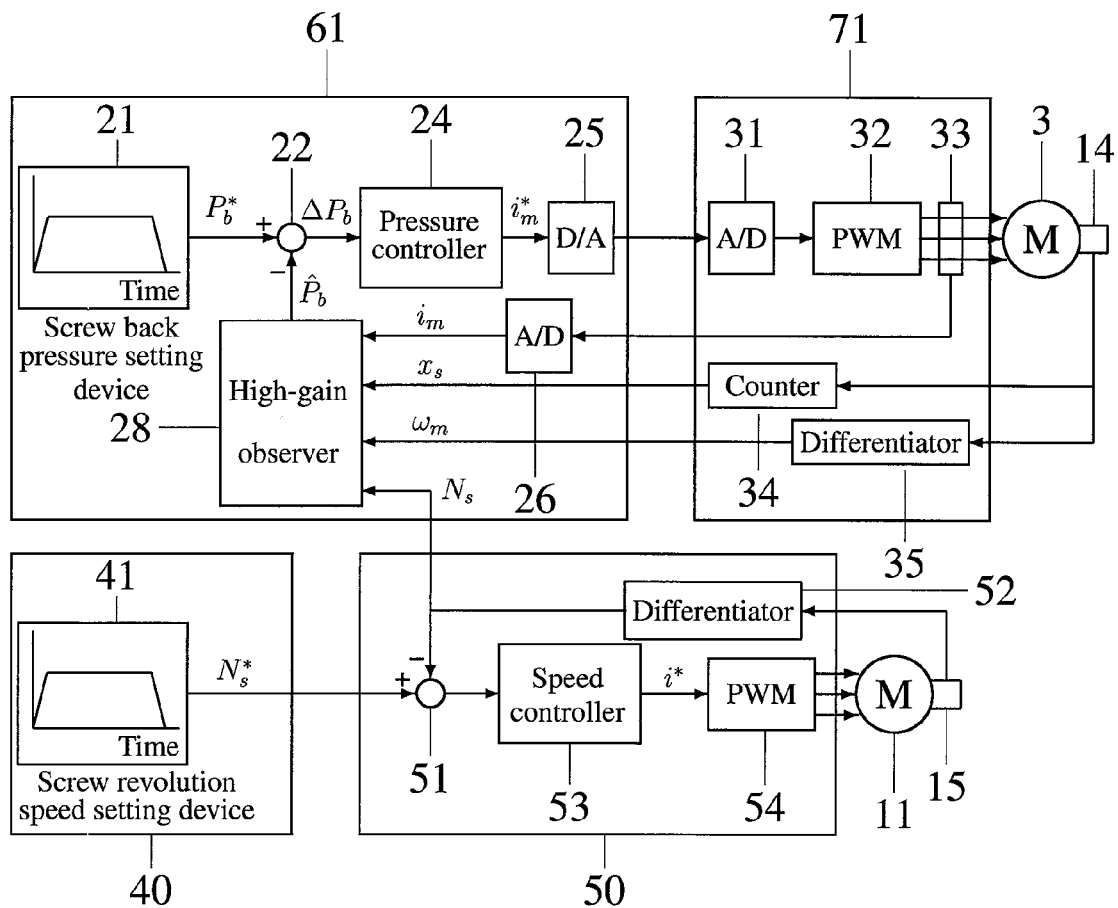
FIG. 2 is an explanation drawing of working example 2 which shows a block diagram of a plasticizing controller for an electric-motor driven injection molding machine according to an embodiment of the present invention.

FIG. 2 is an example of a plasticizing controller of an electric-motor driven injection molding machine using a high-gain observer as a screw back pressure detecting means according to an embodiment of the present invention and shows a block diagram of the plasticizing controller. The plasticizing controller consists of a back pressure controller 61 which contains a high-gain observer 28, a motor controller (servoamplifier) for injection 71, a screw revolution speed controller 40 and a motor controller (servoamplifier) for plasticization 50.

The back pressure controller 61 executes a control algorithm at a constant time interval $\Delta t$ and feeds a discrete-time control demand to the motor controller for injection 71. The back pressure controller 61 consists of the parts with the same reference signs as in Example 1 shown in FIG. 1 and a high-gain observer 28. Descriptions of functions for the parts with the same reference signs as in Example 1 are replaced with those in Example 1 (paragraph {0078}~{0084}).

Actual motor current $i_m$ of the servomotor for injection 3 detected in the motor controller for injection 71 is fed to the high-gain observer 28 through the A/D converter 26. The position signal $x_s$ of the screw 9 which is obtained by accumulating the pulse train from the rotary encoder 14 mounted on the servomotor 3 is fed to the high-gain observer 28. Revolution speed signal $w_m$ of the servomotor for injection 3 which is fed by a differentiator 35 receiving the pulse train from the rotary encoder 14 is fed to the high-gain observer 28. Moreover, actual revolution speed $N_s$ of the screw from the motor controller for plasticization 50 is fed to the high-gain observer 28. The high-gain observer 28 executes discrete-time arithmetic expressions which are obtained from the mathematical model of the plasticizing mechanism and outputs screw back pressure estimate $\hat{P}_b$, screw backward speed estimate $\hat{v}$ and screw position estimate $\hat{x}_s$ (not shown in FIG. 2) by using the input signals $i_m$, $x_s$, $w_m$ and $N_s$.

The motor controller for injection (servoamplifier) 71 consists of the parts with the same reference signs as in Example 1 shown in FIG. 1. Descriptions of functions for the parts with the same reference signs as in Example 1 are replaced with those in Example 1 (paragraph {0085}~{0088}). The pulse train from the rotary encoder 14 mounted on the servomotor 3 is fed to the differentiator 35 in the motor controller for injection 71 and the differentiator 35 feeds the revolution speed signal $w_m$ of the servomotor for injection 3 to the high-gain observer 28.

The state equation of the mathematical model for the plasticizing mechanism shown in FIG. 5 necessary to design the high-gain observer 28 is the same as equation (60) in Example 1 and is given by equation (94).

{Math. 78}

$$\dot{x} = Ax + \begin{bmatrix} 0 \\ \chi(x_2) + cu_1 \\ \psi(x, u_2) \end{bmatrix} \quad (94)$$

$$A = \begin{bmatrix} 0 & a & 0 \\ 0 & 0 & b \\ 0 & 0 & 0 \end{bmatrix}$$

$$x = \begin{bmatrix} x_1 \\ x_2 \\ x_3 \end{bmatrix}$$

The state variables $x_1$, $x_2$, $x_3$ and input variables $u_1$, $u_2$ are the same as those given by equations (53) and (54) in Example 1.

The screw position $x_1$ and the revolution speed $x_2$ of the servomotor for injection (screw backward speed) are measurable state variables and the output variable y is given by equation (95).

{Math. 79}

$$y = \begin{bmatrix} y_1 \\ y_2 \end{bmatrix} = \begin{bmatrix} 1 & 0 & 0 \\ 0 & 1 & 0 \end{bmatrix} \begin{bmatrix} x_1 \\ x_2 \\ x_3 \end{bmatrix} = Cx \quad (95)$$

$$C = \begin{bmatrix} 1 & 0 & 0 \\ 0 & 1 & 0 \end{bmatrix}$$

The high-gain observer 28 estimates all state variables $\hat{x}_1$, $\hat{x}_2$ and $\hat{x}_3$ by using measurable output variables $y_1 = x_1$, $y_2 = x_2$ and input variables of actual motor current $u_1$ of the servomotor for injection and screw revolution speed $u_2$. The estimates $\hat{x}_1$, $\hat{x}_2$ and $\hat{x}_3$ are given by equation (96) (non patent literature NPL 2).

{Math. 80}

$$\dot{\hat{x}} = A\hat{x} + \begin{bmatrix} 0 \\ \chi_0(y_2) + cu_1 \\ \psi_0(\hat{x}_3, y, u_2) \end{bmatrix} - K(C\hat{x} - y) \quad (96)$$

$$\hat{x} = \begin{bmatrix} \hat{x}_1 \\ \hat{x}_2 \\ \hat{x}_3 \end{bmatrix}$$

where $\chi_0(y_2)$, $\psi_0(\hat{x}_3, y, u_2)$: Nominal functions of $\chi(y_2)$, $\psi(x_3, y, u_2)$, respectively used in equation (96), K: Gain matrix of the high-gain observer 28. Introducing a positive parameter $\epsilon$ much smaller than 1, K is given by equation (97).

{Math. 81}

$$K = \begin{bmatrix} K_{11}/\varepsilon & K_{12} \\ K_{21}/\varepsilon^2 & K_{22}/\varepsilon \\ K_{31}/\varepsilon^3 & K_{32}/\varepsilon^2 \end{bmatrix} \quad (97)$$

New estimated variable $\hat{\eta}$ is introduced by equation (98).

{Math. 82}

$$\hat{\eta} = \begin{bmatrix} \hat{\eta}_1 \\ \hat{\eta}_2 \\ \hat{\eta}_3 \end{bmatrix} = \begin{bmatrix} 1 & 0 & 0 \\ 0 & \varepsilon & 0 \\ 0 & 0 & \varepsilon^2 \end{bmatrix} \begin{bmatrix} \hat{x}_1 \\ \hat{x}_2 \\ \hat{x}_3 \end{bmatrix} = D\hat{x} \quad (98)$$

$$D = \begin{bmatrix} 1 & 0 & 0 \\ 0 & \varepsilon & 0 \\ 0 & 0 & \varepsilon^2 \end{bmatrix}$$

By using $\hat{\eta}$, equation (96) is rewritten as equations (99) and (100).

{Math. 83}

$$\dot{\hat{\eta}} = \frac{1}{\varepsilon}\left\{ A_0\hat{\eta} + K_0\bar{y} + \begin{bmatrix} 0 \\ \varepsilon^2\chi_0(y_2) + \varepsilon^2 cu_1 \\ \varepsilon^3\psi_0(\hat{\eta}_3, y, u_2) \end{bmatrix} \right\} \quad (99)$$

$$A_0 = A - K_0 C \quad (100)$$

$$K_0 = \begin{bmatrix} K_{11} & K_{12} \\ K_{21} & K_{22} \\ K_{31} & K_{32} \end{bmatrix}$$

$$\bar{y} = \begin{bmatrix} y_1 \\ \varepsilon y_2 \end{bmatrix}$$

Thus the estimates of all state variables $\hat{x}_1$, $\hat{x}_2$ and $\hat{x}_3$ are obtained by the high-gain observer 28. From equations (99) and (98), the calculation procedures are given by equations (101) and (102).

(1) Calculation Procedure 1

{Math. 84}

$$\dot{\hat{\eta}} = \frac{1}{\varepsilon}\left\{ A_0\hat{\eta} + K_0\bar{y} + \begin{bmatrix} 0 \\ \varepsilon^2\chi_0(y_2) + \varepsilon^2 cu_1 \\ \varepsilon^3\psi_0(\hat{\eta}_3, y, u_2) \end{bmatrix} \right\} \quad (101)$$

Calculation Procedure 2

{Math. 85}

$$\hat{x} = D^{-1}\hat{\eta} \quad (102)$$

By the calculation procedure 1, the estimate $\hat{\eta}$ is obtained and by the calculation procedure 2, the estimate $\hat{x}$ is obtained. Then it is shown that the high-gain observer 28 as a pressure detecting means satisfies the following two requirements (A) and (B) described in Solution to Problem (paragraph {0028}).

(A) The detection means is high-precision.

(B) The detection means has very small time-lag.

If the nominal functions $\chi_0(y_2)$, $\psi_0(\hat{\eta}_3, y, u_2)$ in equation (99) are replaced with the true but actually unobtainable functions $\chi(y_2)$, $\psi(\eta_3, y, u_2)$, the true values $\eta_1$, $\eta_2$ and $\eta_3$ of the estimates $\hat{\eta}_1$, $\hat{\eta}_2$ and $\hat{\eta}_3$ may be obtained by equation (103).

{Math. 86}

$$\dot{\eta} = \frac{1}{\varepsilon}\left\{ A_0\eta + K_0\bar{y} + \begin{bmatrix} 0 \\ \varepsilon^2\chi(y_2) + \varepsilon^2 cu_1 \\ \varepsilon^3\psi(\eta_3, y, u_2) \end{bmatrix} \right\} \quad (103)$$

The estimate error $\tilde{\eta} = \eta - \hat{\eta}$ is obtained by equation (104) by using equation (99) and (103).

{Math. 87}

$$\dot{\tilde{\eta}} = \frac{1}{\varepsilon}\left\{ A_0\tilde{\eta} + \begin{bmatrix} 0 \\ \varepsilon^2\delta_1(y_2) \\ \varepsilon^3\delta_2(\eta_3, \tilde{\eta}_3, y, u_2) \end{bmatrix} \right\} \tilde{\eta} = \begin{bmatrix} \eta_1 - \hat{\eta}_1 \\ \eta_2 - \hat{\eta}_2 \\ \eta_3 - \hat{\eta}_3 \end{bmatrix} \quad (104)$$

$$\delta_1(y_2) = \chi(y_2) - \chi_0(y_2)$$

$$\delta_2(\eta_3, \tilde{\eta}_3, y, u_2) = \psi(\eta_3, y, u_2) - \psi_0(\hat{\eta}_3, y, u_2)$$

As $\varepsilon$ is much smaller than 1, the effects of model errors $\delta_1$, $\delta_2$ on the estimation error $\tilde{\eta}$ can be made small enough by equation (104). In other words, by using the high-gain observer 28, screw back pressure estimate $\hat{x}_3$, revolution speed estimate $\hat{x}_2$ of the servomotor for injection (screw backward speed estimate) and screw position estimate $\hat{x}_1$ obtained by equations (101) and (102) satisfy the above requirement (A) "High-precision detection" (paragraph {0028}).

When the effects of model errors $\delta_1$ and $\delta_2$ on the estimation error $\tilde{\eta}$ are neglected in equation (104), equation (104) is rewritten as equation (105).

{Math. 88}

$$\dot{\tilde{\eta}} = \frac{1}{\varepsilon}A_0\tilde{\eta} \quad (105)$$

$$A_0 = A - K_0 C$$

When matrix $K_0$ is decided so that the real part of conjugate complex eigenvalues $\lambda_1$, $\bar{\lambda}_1$ of matrix $A_0$ becomes negative and real eigenvalue $\lambda_3$ becomes negative, that is, $Re(\lambda_1) = Re(\bar{\lambda}_1) < 0$ and $\lambda_3 < 0$, the estimation errors $\tilde{\eta}_1$, $\tilde{\eta}_2$ and $\tilde{\eta}_3$ are given by equation (106) with initial values $\tilde{\eta}_{10}$, $\tilde{\eta}_{20}$ and $\tilde{\eta}_{30}$, respectively.

{Math. 89}

$$\tilde{\eta}_1(t) = \exp\left(\frac{Re(\lambda_1)}{\varepsilon}t\right)g_1(t, \tilde{\eta}_{10}, \tilde{\eta}_{20}, \tilde{\eta}_{30}) + \exp\left(\frac{\lambda_3}{\varepsilon}t\right)g_2(\tilde{\eta}_{10}, \tilde{\eta}_{20}, \tilde{\eta}_{30})$$

$$\tilde{\eta}_2(t) = \exp\left(\frac{Re(\lambda_1)}{\varepsilon}t\right)g_3(t, \tilde{\eta}_{10}, \tilde{\eta}_{20}, \tilde{\eta}_{30}) + \exp\left(\frac{\lambda_3}{\varepsilon}t\right)g_4(\tilde{\eta}_{10}, \tilde{\eta}_{20}, \tilde{\eta}_{30}) \quad (106)$$

$$\tilde{\eta}_3(t) = \exp\left(\frac{Re(\lambda_1)}{\varepsilon}t\right)g_5(t, \tilde{\eta}_{10}, \tilde{\eta}_{20}, \tilde{\eta}_{30}) + \exp\left(\frac{\lambda_3}{\varepsilon}t\right)g_6(\tilde{\eta}_{10}, \tilde{\eta}_{20}, \tilde{\eta}_{30})$$

where t: Time variable, $g_i(t)$ ($i=1\sim6$): Finite functions decided by elements of matrix $A_0$ and initial values $\tilde{\eta}_{10}$, $\tilde{\eta}_{20}$ and $\tilde{\eta}_{30}$. As $Re(\lambda_1) < 0$, $\lambda_3 < 0$ and $\varepsilon$ is much smaller than 1, equation (106) reveals that the time responses $\tilde{\eta}_1(t)$, $\tilde{\eta}_2(t)$ and $\tilde{\eta}_3(t)$ of estimation errors tend to zero rapidly. In other words, by using the high-gain observer 28, screw back pressure estimate $\hat{x}_3$, revolution speed estimate $\hat{x}_2$ of the servomotor for injection (screw backward speed estimate) and screw position estimate $\hat{x}_1$ obtained by equations (101) and (102) satisfy the above requirement (B) "Detection with small time-lag" (paragraph {0028}).

As the back pressure controller 61 executes a control algorithm at a constant time interval Δt, the arithmetic expressions (101) and (102) of the high-gain observer 28 are transformed into the discrete-time equivalents (non patent literature NPL 3, NPL 4).

The time interval Δt is expressed by equation (107).
{Math. 90}

$$\Delta t = \alpha \varepsilon \tag{107}$$

Discrete-time equivalent of the continuous-time equation (101) can be found by using the standard method of forward rectangular rule which gives the relation between the Laplace-transform operator s representing time-derivative operation and z-transform operator z as follows.

{Math. 91}

$$s = \frac{z-1}{\Delta t} = \frac{z-1}{\alpha \varepsilon} \tag{108}$$

By using equation (108), equation (101) is rewritten as equation (109).

{Math. 92}

$$\frac{z-1}{\alpha \varepsilon} \hat{\eta} = \frac{1}{\varepsilon} \left\{ A_0 \hat{\eta} + K_0 \bar{y} + \begin{bmatrix} 0 \\ \varepsilon^2 \chi_0(y_2) + \varepsilon^2 c u_1 \\ \varepsilon^3 \psi_0(\hat{\eta}_3, y, u_2) \end{bmatrix} \right\} \tag{109}$$

The discrete-time expression of equation (109) is given by equation (110).

{Math. 93}

$$\hat{\eta}(k+1) - \hat{\eta}(k) = \alpha A_0 \hat{\eta}(k) + \alpha K_0 \begin{bmatrix} y_1(k) \\ \varepsilon y_2(k) \end{bmatrix} + \alpha \begin{bmatrix} 0 \\ \varepsilon^2 \chi_0(k) + \varepsilon^2 c u_1(k) \\ \varepsilon^3 \psi_0(k) \end{bmatrix} \tag{110}$$

$$\chi_0(k) = \frac{y_2(k)}{|y_2(k)|}(h|y_2(k)|^\gamma + p) \tag{111}$$

$$\psi_0(k) = \frac{d}{e - y_1(k)}\{y_2(k) + qu_2(k)g(\hat{x}_3(k))\}$$

where $\hat{\eta}(k)$: Estimate $\hat{\eta}(t_k)$ at a discrete-time $t_k$, $y_1(k)$, $y_2(k)$, $u_1(k)$, $u_2(k)$: $y_1(t_k)$, $y_2(t_k)$, $u_1(t_k)$, $u_2(t_k)$ at a discrete-time $t_k$, $\hat{x}_2(k)$: Estimate $\hat{x}_2(t_k)$ at a discrete-time $t_k$, $\hat{x}_3(k)$: Estimate $\hat{x}_3(t_k)$ at a discrete-time $t_k$, $\chi_0(k)$, $\psi_0(k)$: $\chi_0(t_k)$, $\psi_0(t_k)$ at a discrete-time $t_k$. $\chi_0(k)$ is given by equation (58) and $\psi_0(k)$ is given by the third equation of equation (56). Equation (110) is rewritten as equation (112).

{Math. 94}

$$\hat{\eta}(k+1) = (I_3 + \alpha A_0)\hat{\eta}(k) + \alpha K_0 \begin{bmatrix} y_1(k) \\ \varepsilon y_2(k) \end{bmatrix} + \alpha \begin{bmatrix} 0 \\ \varepsilon^2 \chi_0(k) + \varepsilon^2 c u_1(k) \\ \varepsilon^3 \psi_0(k) \end{bmatrix} \tag{112}$$

where $I_3$: 3×3 unit matrix.

The discrete-time equivalent of equation (102) is given by equation (113).

{Math. 95}

$$\begin{bmatrix} \hat{x}_1(k) \\ \hat{x}_2(k) \\ \hat{x}_3(k) \end{bmatrix} = D^{-1} \begin{bmatrix} \hat{\eta}_1(k) \\ \hat{\eta}_2(k) \\ \hat{\eta}_3(k) \end{bmatrix} \tag{113}$$

The results of computer simulation are shown when the high-gain observer 28 is used in the plasticizing process of an electric-motor driven injection molding machine. The constants of the mathematical model are the same as those in Example 1 (paragraph {0208}). The constants a, b, c and d in equation (94) are the same as those given by equation (92) in Example 1.

The gain matrix K of equation (97) used by the high-gain observer 28 is given by equation (114). The data ε=0.25 and Δt=5 msec are used.

{Math. 96}

$$K = \begin{bmatrix} 40.1 & 0.05 \\ 0.81 & 40.6 \\ -0.10 & -5.06 \end{bmatrix} \tag{114}$$

A simulation condition for the screw back pressure control in Example 2 is shown in FIG. 6 and is the same as that in Example 1.

Figure 9:
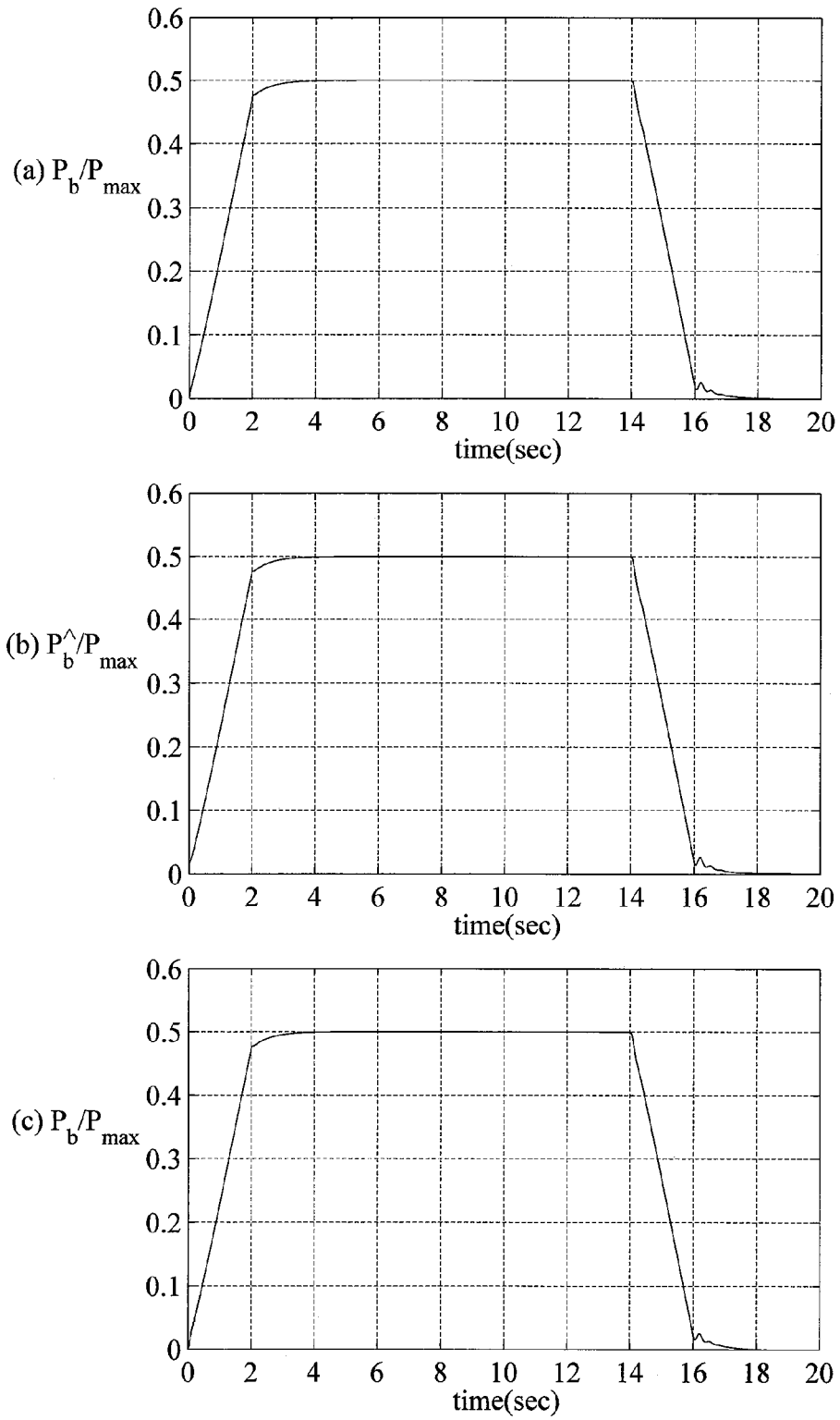
FIG. 9 is an explanation drawing of working example 2 which shows computer simulation results of screw back pressure estimation by the high-gain observer according to an embodiment of the present invention.

FIG. 9 shows time responses of screw back pressure at the control of screw back pressure. FIG. 9(*a*) shows the time response of screw back pressure $P_b$ when the control of screw back pressure $P_b$ is carried out by the plasticizing controller shown in FIG. 4 using the pressure detector 12. The time response of actual screw back pressure $P_b$ shown in FIG. 9(*a*) agrees well with that of screw back pressure command $P^*_b$ shown in FIG. 6(*b*).

When the high-gain observer 28 is supposed to be used under the control system shown in FIG. 4 and to calculate the estimate of screw back pressure $\hat{P}_b$ by using the screw position signal $y_1(t)$, the revolution speed signal $y_2(t)$ of the servomotor for injection (screw backward speed signal), the actual motor current signal $u_1(t)$ of the servomotor for injection and the screw revolution speed signal $u_2(t)$, FIG. 9(*b*) shows the time response of the estimated screw back pressure $\hat{P}_b/P_{max}$. As the time response of screw back pressure in FIG. 9(*a*) agrees well with that of estimated screw back pressure $\hat{P}_b$ in FIG. 9(*b*), it is revealed that the high-gain observer 28 can estimate the screw back pressure exactly with small time-lag.

FIG. 9(*c*) shows the time response of screw back pressure $P_b$ when the control of screw back pressure is carried out by the plasticizing controller shown in FIG. 2 using the high-gain observer 28. As the time response of screw back pressure $P_b$ shown in FIG. 9(*a*) using the pressure detector 12 agrees well with that of screw back pressure $P_b$ shown in FIG. 9(*c*), a good control of screw back pressure can be realized by the high-gain observer 28 without using the pressure detector 12.

The screw position estimate $\hat{x}_1$ and the revolution speed estimate $\hat{x}_2$ of the servomotor for injection agree well with the actual values as well as the screw back pressure estimate $\hat{x}_3$ although they are not shown.

As the high-gain observer both in Example 1 and Example 2 can estimate not only the screw back pressure but also the screw backward speed exactly with small time-lag, the estimates can be used as feedback signals in the control system of the plasticizing process.

INDUSTRIAL APPLICABILITY

In the plasticizing control apparatus and the plasticizing control method of electric-motor driven injection molding machines, the following five disadvantages can be avoided by using the estimated screw back pressure obtained by the high-gain observer as a feedback signal of screw back pressure in place of a pressure detector.
(1) A highly reliable pressure detector is very expensive under high pressure circumstances.
(2) Mounting a pressure detector in the cavity or the barrel nozzle part necessitates the troublesome works and the working cost becomes considerable.
(3) Mounting a load cell in an injection shafting alignment from a servomotor for injection to a screw complicates the mechanical structure and degrades the mechanical stiffness of the structure.
(4) A load cell which uses strain gauges as a detection device necessitates an electric protection against noise for weak analog signals. Moreover the works for zero-point and span adjustings of a signal amplifier are necessary (patent literature PTL 13).
(5) For the improvement of the control accuracy of screw back pressure, the usage of two kinds of pressure detectors with different dynamic ranges brings about the cost increase (patent literature PTL 12).

As the high-gain observer can estimate the screw back pressure and the revolution speed of the servomotor for injection (screw backward speed) exactly with small time-lag, the estimates of screw back pressure and revolution speed of the servomotor for injection obtained by the high-gain observer can be used to monitor the screw back pressure and the screw backward speed and can be used as feedback signals in the control system. Thus the high-gain observer of the present invention can be applied to the plasticizing control apparatus and the plasticizing control method of electric-motor driven injection molding machines.

REFERENCE SIGNS LIST

1 Metal mold
2 Barrel
3 Servomotor for injection
4 Reduction gear
5 Ball screw
6 Bearing
7 Nut
8 Moving part
9 Screw
10 Reduction gear
11 Servomotor for plasticization
12 Pressure detector
13 Linear slider
14 Rotary encoder
15 Rotary encoder
16 Hopper
17 Cavity
20 Back pressure controller
21 Screw back pressure setting device
22 Subtracter
23 Analog/digital (A/D) converter
24 Pressure controller
25 Digital/analog (D/A) converter
26 Analog/digital (A/D) converter
27 High-gain observer
28 High-gain observer
30 Motor controller (servoamplifier) for injection
31 Analog/digital (A/D) converter
32 PWM (Pulse Width Modulation) device
33 Current transducer
34 Pulse counter
35 Differentiator
40 Screw revolution speed controller
41 Screw revolution speed setting device
50 Motor controller (servoamplifier) for plasticization
51 Subtracter
52 Differentiator
53 Speed controller
54 PWM (Pulse Width Modulation) device
60 Back pressure controller
61 Back pressure controller
70 Motor controller (servoamplifier) for injection
71 Motor controller (servoamplifier) for injection

The invention claimed is:
1. A method for controlling a plasticizing capability in an electric-motor driven injection molding machine having a plasticizing mechanism which consists of a screw revolution drive system where rotation of a servomotor for plasticization is transferred to rotation of a screw through a reduction gear and resin pellets fed through a hopper are melted by the rotation of said screw and a given amount of melted polymer is stored at the end of a barrel and a screw injection drive system where rotation of a servomotor for injection is transferred to rotation of a ball screw through a reduction gear and rotation of said ball screw is converted to a linear motion of a nut of said ball screw and said screw is moved back and forth through a moving part driven by a movement of said nut and pressure application to the melted polymer stored at the end of said barrel is realized by the movement of said screw and the pressure applied to the melted polymer is referred to as a screw back pressure,
comprising:
deriving an estimate of screw back pressure $\hat{x}_3$ and an estimate of a screw backward speed $\hat{x}_2$ which a high-gain observer outputs by using the input signals of a screw position signal detected by a rotary encoder mounted on said servomotor for injection, a motor current demand signal applied to said servomotor for injection or an actual motor current signal of said servomotor for injection and a screw revolution speed signal detected by a rotary encoder mounted on said servomotor for plasticization and by executing at a constant time interval discrete-time arithmetic expressions wherein the equation (118) and the equation (121) are used, which are obtained by applying a standard method of forward rectangular rule to a continuous-time calculation procedures which are derived from a mathematical model representing motion equations of said plasticizing mechanism and consisting of state equations having three state variables of a screw position variable, a screw backward speed variable and a screw back pressure variable and having two input variables of said motor current demand signal or said actual motor current signal of said servomotor for injection and said screw revolution speed signal and having one output variable of said screw position signal wherein the equation (115) and the equation (116) are used;

$$\dot{x} = Ax + \begin{bmatrix} 0 \\ \chi(x_2) + cu_1 \\ \psi(x, u_2) \end{bmatrix} \quad A = \begin{bmatrix} 0 & a & 0 \\ 0 & 0 & b \\ 0 & 0 & 0 \end{bmatrix} \quad x = \begin{bmatrix} x_1 \\ x_2 \\ x_3 \end{bmatrix} \quad (115)$$

$$y = [1 \ 0 \ 0]x \quad (116)$$

$$\chi(x_2) = \frac{x_2}{|x_2|}(h|x_2|^\gamma + p) \quad \psi(x, u_2) = \frac{d}{e - x_1}\{x_2 + qf(x_3, u_2)\} \quad (117)$$

where $x_1$: State variable of screw position dimensionless made by maximum stroke of screw backward movement, $x_2$: State variable of screw backward speed dimensionless made by maximum screw backward speed, $x_3$: State variable of screw back pressure dimensionless made by maximum screw back pressure, $u_1$: Input variable of motor current demand or actual motor current of a servomotor for injection dimensionless made by the motor current rating, $u_2$: Input variable of screw revolution speed dimensionless made by maximum screw revolution speed, y: Dimensionless output variable expressing measurable state variable $x_1$, a, b, c, d, e, h, p, q, $\gamma$: Constants of said mathematical model of said plasticizing mechanism, $\chi(x_2)$, $\psi(X, u_2)$: Nonlinear functions of the equation (117), $f(x_3, u_2)$: Plasticizing rate function of dimensionless state variable $x_3$ and dimensionless input variable $u_2$ dimensionless made by maximum plasticizing rate $$\begin{bmatrix} \hat{\eta}_1(k+1) \\ \hat{\eta}_2(k+1) \end{bmatrix} = \quad (118)$$

$$(I_2 + \alpha A_0)\begin{bmatrix} \hat{\eta}_1(k) \\ \hat{\eta}_2(k) \end{bmatrix} + \alpha A_0 K_0 y(k) + \alpha \begin{bmatrix} \varepsilon^2 \chi(k) + \varepsilon^2 c u_1(k) \\ \varepsilon^3 \psi(k) \end{bmatrix}$$

$$A_0 = A_{22} - K_0 A_{12} \quad A_{12} = [a \ 0] \quad A_{22} = \begin{bmatrix} 0 & b \\ 0 & 0 \end{bmatrix} \quad (119)$$

$$K_0 = \begin{bmatrix} K_1 \\ K_2 \end{bmatrix} \quad \alpha = \frac{\Delta t}{\varepsilon}$$

$$\chi(k) = \frac{\hat{x}_2(k)}{|\hat{x}_2(k)|}(h|\hat{x}_2(k)|^\gamma + p) \quad (120)$$

$$\psi(k) = \frac{d}{e - y(k)}\{\hat{x}_2(k) + qf(\hat{x}_3(k), u_2(k))\}$$

where k: Discrete variable representing a discrete-time $t_k$ (k=0, 1, 2, ...), $\hat{\eta}_1(k)$, $\hat{\eta}_2(k)$: Estimates $\hat{\eta}_1(t_k)$, $\hat{\eta}_2(t_k)$ of new state variables $\eta_1$, $\eta_2$ introduced for estimating state variables $x_2$, $x_3$ at a discrete-time $t_k$, y(k), $u_1(k)$, $u_2(k)$: Output variable $y(t_k)$ and input variables $u_1(t_k)$, $u_2(t_k)$ at a discrete-time $t_k$, $\hat{x}_2(k)$, $\hat{x}3(k)$: Estimates $\hat{x}_2(t_k)$, $\hat{x}_3(t_k)$ of state variables $x_2$, $x_3$ at a discrete-time $t_k$, $\chi(k)$, $\psi(k)$: $\chi(t_k)$, $\psi(t_k)$ at a discrete-time $t_k$, $I_2$: 2×2 unit matrix, $\Delta t$: Sampling period of a discrete-time high-gain observer, $\varepsilon$: Positive parameter much smaller than 1 used in the high-gain observer, $K_1$, $K_2$: Gain constants of the high-gain observer which are decided so that matrix $A_0$ has conjugate complex eigenvalues with a negative real part $$\begin{bmatrix} \hat{x}_2(k) \\ \hat{x}_3(k) \end{bmatrix} = D^{-1}\begin{bmatrix} \hat{\eta}_1(k) \\ \hat{\eta}_2(k) \end{bmatrix} + D^{-1}K_0 y(k) \quad (121)$$

$$D = \begin{bmatrix} \varepsilon & 0 \\ 0 & \varepsilon^2 \end{bmatrix}$$

where $\hat{x}_2(k)$, $\hat{x}_3(k)$: Estimates $\hat{x}_2(t_k)$, $\hat{x}_3(t_k)$ of state variables $x_2$, $x_3$ at a discrete-time $t_k$ providing a high-precision detection means for said estimate of screw back pressure which makes the effects of the errors of said mathematical model of said plasticizing mechanism on the estimation error small enough and enables said estimation of screw back pressure to be high-precision wherein the equation (122) is used to show that the estimation error $\tilde{\eta}$ caused by the model errors $\delta_1$, $\delta_2$ becomes small as said positive parameter $\epsilon$ is much smaller than 1 and by neglecting the effects of model errors $\delta_1$, $\delta_2$ in the equation (122) the equation (125) is used to decide the time response of the estimation error $\tilde{\eta}$ of screw back pressure;

$$\begin{bmatrix} \dot{\tilde{\eta}}_1 \\ \dot{\tilde{\eta}}_2 \end{bmatrix} = \frac{1}{\varepsilon}(A_{22} - K_0 A_{12})\begin{bmatrix} \tilde{\eta}_1 \\ \tilde{\eta}_2 \end{bmatrix} + \begin{bmatrix} \varepsilon \delta_1(\eta_1, \hat{\eta}_1, y) \\ \varepsilon^2 \delta_2(\eta, \hat{\eta}, y, u_2) \end{bmatrix} \quad (122)$$

$$\tilde{\eta} = \begin{bmatrix} \tilde{\eta}_1 \\ \tilde{\eta}_2 \end{bmatrix} = \begin{bmatrix} \eta_1 - \hat{\eta}_1 \\ \eta_2 - \hat{\eta}_2 \end{bmatrix} = \begin{bmatrix} \varepsilon(x_2 - \hat{x}_2) \\ \varepsilon^2(x_3 - \hat{x}_3) \end{bmatrix} \quad (123)$$

$$\left.\begin{array}{l} \delta_1(\eta_1, \hat{\eta}_1, y) = \chi(\eta_1, y) - \chi_0(\hat{\eta}_1, y) \\ \delta_2(\eta, \hat{\eta}, y, u_2) = \psi(\eta, y, u_2) - \psi_0(\hat{\eta}, y, u_2) \end{array}\right\} \quad (124)$$

$$\begin{bmatrix} \dot{\tilde{\eta}}_1 \\ \dot{\tilde{\eta}}_2 \end{bmatrix} = \frac{1}{\varepsilon}A_0\begin{bmatrix} \tilde{\eta}_1 \\ \tilde{\eta}_2 \end{bmatrix} \quad A_0 = A_{22} - K_0 A_{12} \quad K_0 = \begin{bmatrix} K_1 \\ K_2 \end{bmatrix} \quad (125)$$

where $\tilde{\eta}_1$: Estimate error of screw backward speed, $\tilde{\eta}_2$: Estimate error of screw back pressure providing a detection means having very small time-lag for said estimate of screw back pressure which makes the estimation error tend to zero rapidly and enables said estimate of screw back pressure to be detected with very small time-lag wherein the equation (126) given as the time responses of the equation (125) is used to show that the estimation errors $\tilde{\eta}_1$, $\tilde{\eta}_2$ caused by neglecting the effects of the model errors $\delta_1$, $\delta_2$ tend to zero rapidly because matrix $K_0$ is decided so that the real part of conjugate complex eigenvalues $\lambda_1$, $\bar{\lambda}_1$ of matrix $A_0$ becomes negative, that is, $\text{Re}(\lambda_1)=\text{Re}(\bar{\lambda}_1)<0$ and said positive parameter E is much smaller than 1;

$$\tilde{\eta}_1(t) = \exp\left(\frac{\text{Re}(\lambda_1)}{\varepsilon}t\right)(C_1(t)\tilde{\eta}_{10} + C_2(t)\tilde{\eta}_{20}) \quad (126)$$

$$\tilde{\eta}_2(t) = \exp\left(\frac{\text{Re}(\lambda_1)}{\varepsilon}t\right)(C_3(t)\tilde{\eta}_{10} + C_4(t)\tilde{\eta}_{20})$$

where t: Time variable, $C_1(t)$~$C_4(t)$: Sinusoidal components with constant amplitudes and constant frequency decided by elements of matrix $A_0$, $\tilde{\eta}_{10}$, $\tilde{\eta}_{20}$: initial values of estimate errors $\tilde{\eta}_1(t)$, $\tilde{\eta}_2(t)$ deriving a difference signal between a screw back pressure command signal from a screw back pressure setting device and said estimate of screw back pressure from said high-gain observer by using a subtracter; and deriving a motor current demand signal applied to said servomotor for injection by using a pressure controller to which said difference signal is fed from said subtracter so that said estimate of screw back pressure follows said screw back pressure command signal by generating a motor torque of said servomotor for injection corresponding to said motor current demand signal and by realizing a given screw back pressure.

2. A method for controlling a plasticizing capability in an electric-motor driven injection molding machine having a plasticizing mechanism which consists of a screw revolution drive system where rotation of a servomotor for plasticization is transferred to rotation of a screw through a reduction gear and resin pellets fed through a hopper are melted by the rotation of said screw and a given amount of melted polymer is stored at the end of a barrel and a screw injection drive system where rotation of a servomotor for injection is transferred to rotation of a ball screw through a reduction gear and rotation of said ball screw is converted to a linear motion of a nut of said ball screw and said screw is moved back and forth through a moving part driven by a movement of said nut and pressure application to the melted polymer stored at the end of said barrel is realized by the movement of said screw and the pressure applied to the melted polymer is referred to as a screw back pressure, comprising:

deriving an estimate of screw back pressure $\hat{x}_3$, an estimate of a screw backward speed $\hat{x}_2$ and an estimate of a screw position $\hat{x}_1$ which a high-gain observer outputs by using the input signals of a screw position signal, a screw backward speed signal (a revolution speed signal of said servomotor for injection) detected by a rotary encoder mounted on said servomotor for injection, a motor current demand signal applied to said servomotor for injection or an actual motor current signal of said servomotor for injection and a screw revolution speed signal detected by a rotary encoder mounted on said servomotor for plasticization and by executing at a constant time interval discrete-time arithmetic expressions wherein the equation (130) and the equation (133) are used, which are obtained by applying a standard method of forward rectangular rule to a continuous-time calculation procedures which are derived from a mathematical model representing motion equations of said plasticizing mechanism and consisting of state equations having three state variables of a screw position variable, a screw backward speed variable and a screw back pressure variable and having two input variables of said motor current demand signal or said actual motor current signal of said servomotor for injection and said screw revolution speed signal and having two output variables of said screw position signal and said screw backward speed signal wherein the equation (127) and the equation (128) are used;

$$\dot{x} = Ax + \begin{bmatrix} 0 \\ \chi(x_2) + cu_1 \\ \psi(x, u_2) \end{bmatrix} \quad A = \begin{bmatrix} 0 & a & 0 \\ 0 & 0 & b \\ 0 & 0 & 0 \end{bmatrix} \quad x = \begin{bmatrix} x_1 \\ x_2 \\ x_3 \end{bmatrix} \quad (127)$$

$$y = \begin{bmatrix} y_1 \\ y_2 \end{bmatrix} = \begin{bmatrix} x_1 \\ x_2 \end{bmatrix} = Cx \quad C = \begin{bmatrix} 1 & 0 & 0 \\ 0 & 1 & 0 \end{bmatrix} \quad (128)$$

$$\chi(x_2) = \frac{x_2}{|x_2|}(h|x_2|^\gamma + p) \quad \psi(x, u_2) = \frac{d}{e - x_1}\{x_2 + qf(x_3, u_2)\} \quad (129)$$

where $x_1$: State variable of screw position dimensionless made by maximum stroke of screw backward movement, $x_2$: State variable of screw backward speed dimensionless made by maximum screw backward speed, $x_3$: State variable of screw back pressure dimensionless made by maximum screw back pressure, $u_1$: Input variable of motor current demand or actual motor current of a servomotor for injection dimensionless made by the motor current rating, $u_2$: Input variable of screw revolution speed dimensionless made by maximum screw revolution speed, $y_1$, $y_2$: Dimensionless output variables expressing measurable state variables $x_1$, $x_2$, respectively, a, b, c, d, e, h, p, q, $\gamma$: Constants of a mathematical model of a plasticizing mechanism, $\chi(x_2)$, $\psi(x,u_2)$: Nonlinear functions of the equation (129), $f(x_3,u_2)$: Plasticizing rate function of dimensionless state variable $x_3$ and dimensionless input variable $u_2$ dimensionless made by maximum plasticizing rate $$\begin{bmatrix} \hat{\eta}_1(k+1) \\ \hat{\eta}_2(k+1) \\ \hat{\eta}_3(k+1) \end{bmatrix} = (I_3 + \alpha A_0)\begin{bmatrix} \hat{\eta}_1(k) \\ \hat{\eta}_2(k) \\ \hat{\eta}_3(k) \end{bmatrix} + \alpha K_0 \begin{bmatrix} y_1(k) \\ \varepsilon y_2(k) \end{bmatrix} + \alpha \begin{bmatrix} 0 \\ \varepsilon^2 \chi(k) + \varepsilon^2 cu_1(k) \\ \varepsilon^3 \psi(k) \end{bmatrix} \quad (130)$$

$$A_0 = A - K_0 C \quad K_0 = \begin{bmatrix} K_{11} & K_{12} \\ K_{21} & K_{22} \\ K_{31} & K_{32} \end{bmatrix} \quad \alpha = \frac{\Delta t}{\varepsilon} \quad (131)$$

$$\chi(k) = \frac{y_2(k)}{|y_2(k)|}(h|y_2(k)|^\gamma + p) \quad (132)$$

$$\psi(k) = \frac{d}{e - y_1(k)}\{y_2(k) + qf(\hat{x}_3(k), u_2(k))\}$$

where k: Discrete variable representing a discrete-time $t_k$ (k=0, 1, 2, ...), $\hat{\eta}_1(k)$, $\hat{\eta}_2(k)$, $\hat{\eta}_3(k)$: Estimates $\hat{\eta}_1(t_k)$, $\hat{\eta}_2(t_k)$, $\hat{\eta}_3(t_k)$ of new state variables $\eta_1$, $\eta_2$, $\eta_3$ introduced for estimating state variables $x_1$, $x_2$, $x_3$ at a discrete-time $t_k$, $y_1(k)$, $y_2(k)$, $u_1(k)$, $u_2(k)$: Output variables $y_1(t_k)$, $y_2(t_k)$ and input variables $u_1(t_k)$, $u_2(t_k)$ at a discrete-time $t_k$, $\hat{x}_3(k)$: Estimates $x_3(t_k)$ of state variable $x_3$ at a discrete-time $t_k$, $\chi(k)$, $\psi(k)$: $\chi(t_k)$, $\psi(t_k)$ at a discrete-time $t_k$, $I_3$: 3×3 unit matrix, $\Delta t$: Sampling period of a discrete-time high-gain observer, $\varepsilon$: Positive parameter much smaller than 1 used in the high-gain observer, $K_0$: Gain matrix of the high-gain observer which is decided so that matrix $A_0$ has conjugate complex eigenvalues with a negative real part and a negative real eigenvalue $$\begin{bmatrix} \hat{x}_1(k) \\ \hat{x}_2(k) \\ \hat{x}_3(k) \end{bmatrix} = D^{-1}\begin{bmatrix} \hat{\eta}_1(k) \\ \hat{\eta}_2(k) \\ \hat{\eta}_3(k) \end{bmatrix} \quad D = \begin{bmatrix} 1 & 0 & 0 \\ 0 & \varepsilon & 0 \\ 0 & 0 & \varepsilon^2 \end{bmatrix} \quad (133)$$

where $\hat{x}_1(k)$, $\hat{x}_2(k)$, $\hat{x}(k)$: Estimates $\hat{x}_1(t_k)$, $\hat{x}_2(t_k)$, $\hat{x}_3(t_k)$ of state variables $x_1$, $x_2$, $x_3$ at a discrete-time $t_k$ providing a high-precision detection means for said estimate of screw back pressure which makes the effects of the errors of said mathematical model of said plasticizing mechanism on the estimation error small enough and enables said estimation of screw back pressure to be high-precision wherein the equation (134) is used to show that the estimation error $\tilde{\eta}$ caused by the model errors $\delta_1$, $\delta_2$ becomes small as said positive parameter $\varepsilon$ is much smaller than 1 and by neglecting the effects of model errors $\delta_1$, $\delta_2$ in the equation (134) the equation (137) is used to decide the time response of the estimation error $\tilde{\eta}$ of screw back pressure;

$$\dot{\tilde{\eta}} = \frac{1}{\varepsilon}\left\{A_0\tilde{\eta} + \begin{bmatrix} 0 \\ \varepsilon^2\delta_1(y_2) \\ \varepsilon^3\delta_2(\eta_3, \tilde{\eta}_3, y, u_2) \end{bmatrix}\right\} \quad (134)$$

$$\tilde{\eta} = \begin{bmatrix} \tilde{\eta}_1 \\ \tilde{\eta}_2 \\ \tilde{\eta}_3 \end{bmatrix} = \begin{bmatrix} \eta_1 - \hat{\eta}_1 \\ \eta_2 - \hat{\eta}_2 \\ \eta_3 - \hat{\eta}_3 \end{bmatrix} = \begin{bmatrix} x_1 - \hat{x}_1 \\ \varepsilon(x_2 - \hat{x}_2) \\ \varepsilon^2(x_3 - \hat{x}_3) \end{bmatrix} \quad (135)$$

$$\left.\begin{aligned}\delta_1(y_2) &= \chi(y_2) - \chi_0(y_2) \\ \delta_2(\eta_3, \tilde{\eta}_3, y, u_2) &= \psi(\eta_3, y, u_2) - \psi_0(\hat{\eta}_3, y, u_2)\end{aligned}\right\} \quad (136)$$

$$\dot{\tilde{\eta}} = \frac{1}{\varepsilon}A_0\tilde{\eta} \quad A_0 = A - K_0 C \quad (137)$$

where $\tilde{\eta}_1$: Estimate error of screw position, $\tilde{\eta}_2$: Estimate error of screw backward speed, $\tilde{\eta}_3$: Estimate error of screw back pressure providing a detection means having very small time-lag for said estimate of screw back pressure which makes the estimation error tend to zero rapidly and enables said estimate of screw back pressure to be detected with very small time-lag wherein the equation (138) given as the time responses of the equation (137) is used to show that the estimation errors $\tilde{\eta}_1, \tilde{\eta}_2, \tilde{\eta}_3$ caused by neglecting the effects of the model errors $\delta_1$, $\delta_2$ tend to zero rapidly because matrix $K_0$ is decided so that the real part of conjugate complex eigenvalues $\lambda_1$, $\bar{\lambda}_1$ of matrix $A_0$ becomes negative and a real eigenvalue $\lambda_3$ becomes negative, that is, $\mathrm{Re}(\lambda_1)=\mathrm{Re}(\bar{\lambda}_1)<0$ and $\lambda_3<0$ and said positive parameter $\varepsilon$ is much smaller than 1;

$$\left.\begin{aligned}\tilde{\eta}_1(t) &= \exp\left(\frac{\mathrm{Re}(\lambda_1)}{\varepsilon}t\right)g_1(t, \tilde{\eta}_{10}, \tilde{\eta}_{20}, \tilde{\eta}_{30}) + \\ &\quad \exp\left(\frac{\lambda_3}{\varepsilon}t\right)g_2(\tilde{\eta}_{10}, \tilde{\eta}_{20}, \tilde{\eta}_{30}) \\ \tilde{\eta}_2(t) &= \exp\left(\frac{\mathrm{Re}(\lambda_1)}{\varepsilon}t\right)g_3(t, \tilde{\eta}_{10}, \tilde{\eta}_{20}, \tilde{\eta}_{30}) + \\ &\quad \exp\left(\frac{\lambda_3}{\varepsilon}t\right)g_4(\tilde{\eta}_{10}, \tilde{\eta}_{20}, \tilde{\eta}_{30}) \\ \tilde{\eta}_3(t) &= \exp\left(\frac{\mathrm{Re}(\lambda_1)}{\varepsilon}t\right)g_5(t, \tilde{\eta}_{10}, \tilde{\eta}_{20}, \tilde{\eta}_{30}) + \\ &\quad \exp\left(\frac{\lambda_3}{\varepsilon}t\right)g_6(\tilde{\eta}_{10}, \tilde{\eta}_{20}, \tilde{\eta}_{30})\end{aligned}\right\} \quad (138)$$

where t: Time variable $g_i(t)$ (i=1~6): Finite functions decided by elements of matrix $A_0$ and initial values of estimate errors $\tilde{\eta}_{10}, \tilde{\eta}_{20}, \tilde{\eta}_{30}$ deriving a difference signal between a screw back pressure command signal from a screw back pressure setting device and said estimate of screw back pressure from said high-gain observer by using a subtracter; and deriving a motor current demand signal applied to said servomotor for injection by using a pressure controller to which said difference signal is fed from said subtracter so that said estimate of screw back pressure follows said screw back pressure command signal by generating a motor torque of said servomotor for injection corresponding to said motor current demand signal and by realizing a given screw back pressure.

\* \* \* \* \*